US012067320B2

(12) United States Patent
Nishida et al.

(10) Patent No.: US 12,067,320 B2
(45) Date of Patent: Aug. 20, 2024

(54) IMAGE PROCESSING DEVICE FOR WIRELESS COMMUNICATION WITH A TERMINAL DEVICE

(71) Applicant: SEIKO EPSON CORPORATION, Tokyo (JP)

(72) Inventors: Kota Nishida, Shiojiri (JP); Hiroyuki Kuramoto, Shiojiri (JP); Yui Imamura, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/455,091

(22) Filed: Aug. 24, 2023

(65) Prior Publication Data
US 2024/0069841 A1     Feb. 29, 2024

(30) Foreign Application Priority Data

Aug. 25, 2022 (JP) ................. 2022-133913

(51) Int. Cl.
G06F 3/12         (2006.01)
(52) U.S. Cl.
CPC .......... *G06F 3/1292* (2013.01); *G06F 3/1203* (2013.01); *G06F 3/1221* (2013.01); *G06F 3/1236* (2013.01)
(58) Field of Classification Search
CPC .... G06F 3/1292; G06F 3/1203; G06F 3/1221; G06F 3/1236
USPC ....................................................... 358/1.15
See application file for complete search history.

(56) References Cited

U.S. PATENT DOCUMENTS

| 9,606,762 B2* | 3/2017 | Oishi ................. H04N 1/00278 |
| 2013/0155450 A1* | 6/2013 | Higashikawa ......... B41J 2/1752 358/1.15 |
| 2014/0104630 A1* | 4/2014 | Baba .................. H04N 1/00323 358/1.13 |
| 2014/0104631 A1* | 4/2014 | Baba .................. H04N 1/00323 358/1.13 |
| 2021/0037149 A1 | 2/2021 | Nagahara |
| 2021/0191674 A1* | 6/2021 | Hada .................. H04N 1/32765 |

FOREIGN PATENT DOCUMENTS

JP        2021-024120 A     2/2021

* cited by examiner

*Primary Examiner* — Allen H Nguyen
(74) *Attorney, Agent, or Firm* — WORKMAN NYDEGGER

(57) ABSTRACT

An image processing device is communicatively connected to a terminal device. An operation panel accepts an operation from a user. A communication unit has a plurality of antennas and is used to communicate with the terminal device. A controller performs control according to direction information representing a direction of the terminal device in relation to the image processing device, acquired based on a radio wave transmitted between the terminal device and the communication unit. The communication unit is provided within a range corresponding to the operation panel, in a left-right direction as viewed from a front face side where the operation panel can be operated, of side faces of the image processing device.

5 Claims, 17 Drawing Sheets

| JOB IDENTIFICATION INFORMATION | USER IDENTIFICATION INFORMATION | WITH OR WITHOUT AUTHENTICATION PROCESSING |
|---|---|---|
| JOB A | USER A | WITH AUTHENTICATION |
| JOB B | USER B | WITHOUT AUTHENTICATION |
| ... | ... | ... |

| USER IDENTIFICATION INFORMATION | DEVICE IDENTIFICATION INFORMATION | |
|---|---|---|
| USER A | TERMINAL #1 | PC#1 |
| USER B | TERMINAL #2 | PC#2 |
| ... | ... | ... |

IMAGE PROCESSING DEVICE FOR WIRELESS COMMUNICATION WITH A TERMINAL DEVICE

The present application is based on, and claims priority from JP Application Serial Number 2022-133913, filed Aug. 25, 2022, the disclosure of which is hereby incorporated by reference herein in its entirety.

BACKGROUND

1. Technical Field

The present disclosure relates to an image processing device.

2. Related Art

JP-A-2021-24120 discloses a printing device that receives a signal from another device. The printing device according to JP-A-2021-24120 acquires a direction of arrival and an intensity of reception of a signal received from another device and executes predetermined processing for printing, based on the direction of arrival and the intensity of reception thus acquired.

When a user uses an image processing device such as a printing device, the user in many cases approaches the image processing device, aiming at an operation panel provided in the image processing device. Therefore, in order for the image processing device to perform processing according to the position of the user, the position of the user in relation to the operation panel needs to be detected accurately. However, in the technique according to JP-A-2021-24120, there is a risk that the relative position between the operation panel of the image processing device and a terminal device held by the user may not be detected accurately.

SUMMARY

According to an aspect of the present disclosure, an image processing device communicatively connected to a terminal device is provided. The image processing device includes: an operation panel that accepts an operation from a user; a communication unit that has a plurality of antennas and is used to communicate with the terminal device; and a control unit that performs control according to direction information representing a direction of the terminal device in relation to the image processing device, acquired based on a radio wave transmitted between the terminal device and the communication unit. The communication unit is provided within a range corresponding to the operation panel, in a left-right direction as viewed from a front face side where the operation panel can be operated, of side faces of the image processing device.

DESCRIPTION OF EMBODIMENTS

Embodiment 1

Figure 1:
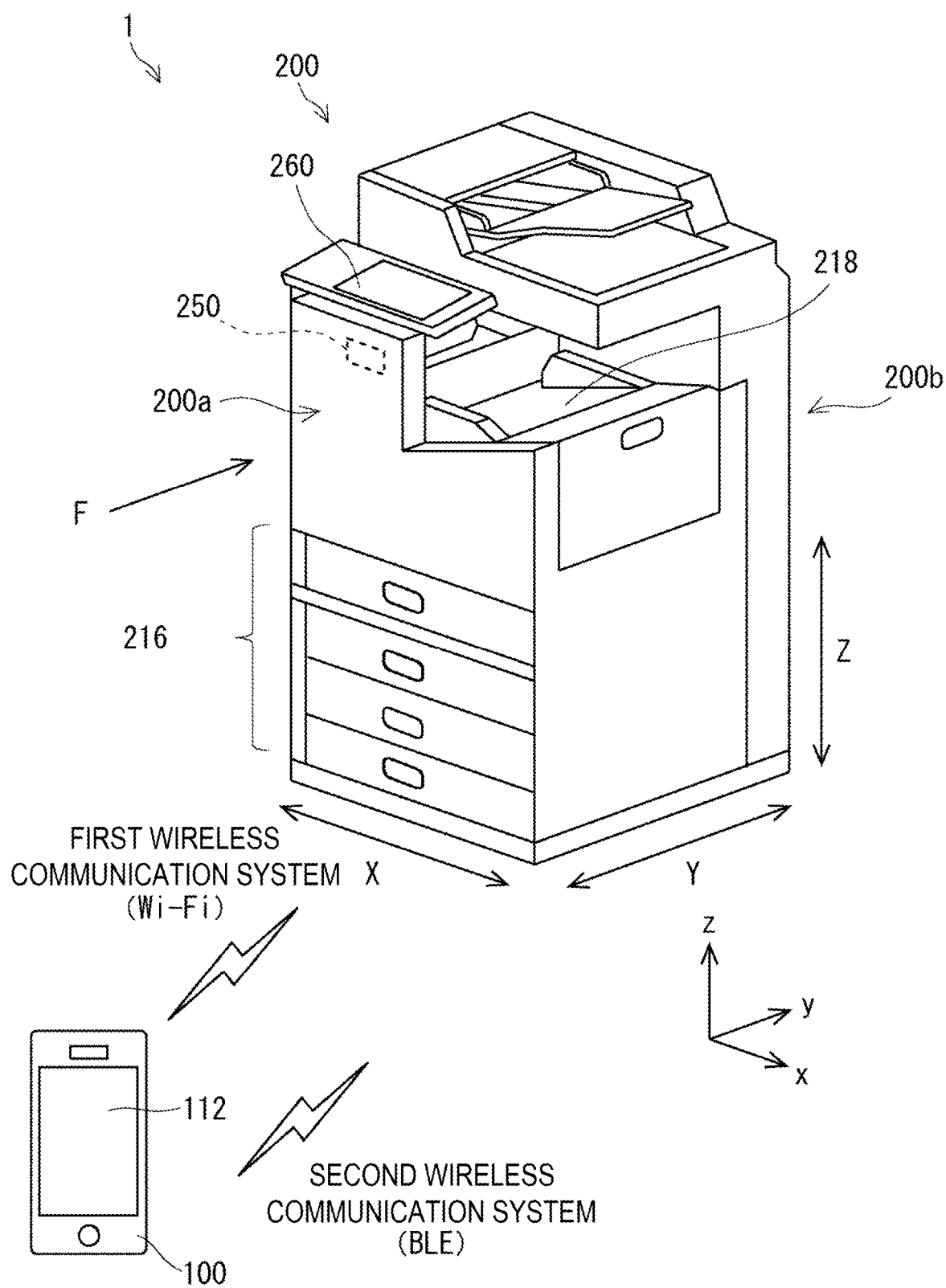
FIG. 1 shows an image processing system according to Embodiment 1.

An embodiment will now be described with reference to the drawings. In order to clarify the explanation, suitable omissions and simplifications are made in the description and drawings given below. In the drawings, the same elements are denoted by the same reference sign and the repeated description thereof is omitted according to need.

Figure 2:
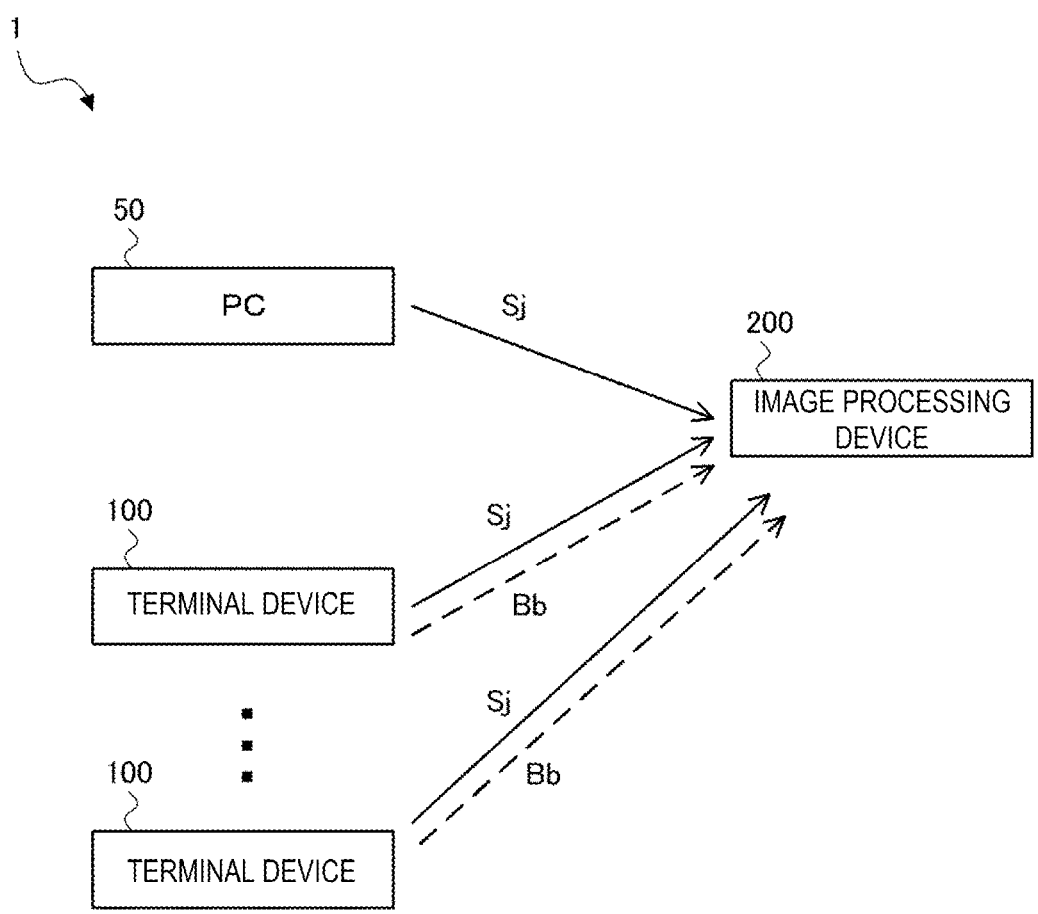
FIG. 2 shows the image processing system according to Embodiment 1.

FIGS. 1 and 2 show an image processing system 1 according to Embodiment 1. The image processing system 1 has a terminal device 100 and an image processing device 200. As shown in FIG. 2, the image processing system 1 may have a PC 50 (personal computer). The PC 50 may be, for example, a desktop computer device.

The terminal device 100 is, for example, a portable terminal device such as a smartphone or a tablet terminal. The terminal device 100 may also be a computer device such as a portable laptop PC. The terminal device 100 has at least a display unit 112. The other components of the terminal device 100 will be described later.

The image processing device 200 performs image processing designated by a user. The image processing device 200 is, for example, a printer. The image processing device 200 may also be, for example, a multifunction peripheral (MFP), a copy machine, or a scanner or the like. Also, a multifunction peripheral having a print function is an example of a printer. In Embodiment 1, a case where the image processing device 200 is, for example, a printer such as a multifunction peripheral, is described. The image processing device 200, which is a printer, performs image forming processing of forming an image on a print medium such as a paper, that is, print processing, as image processing. However, the image processing device 200 may perform image processing other than the image forming processing. For example, the image processing device 200 may perform image processing such as copying or scanning.

As shown in FIG. 1, the image processing device 200, which is a printer, has at least an operation panel 260, a paper feed tray 216, and a paper discharge tray 218. The operation panel 260 has, for example, a touch panel formed of a display device and an input device integrated together. The operation panel 260 accepts an operation from the user. The paper feed tray 216 stores a paper, which is a print medium, for example, by paper size. A paper with an image formed thereon is discharged onto the paper discharge tray 218. The other components of the image processing device 200 will be described later.

As shown in FIG. 1, an xyz coordinate system is prescribed for the image processing device 200. The z-axis corresponds to a direction along an upward-downward direction of the image processing device 200 as indicted by an arrow Z, that is, a vertical direction. A positive direction along the z-axis corresponds to an upward direction of the image processing device 200. A negative direction along the z-axis correspond to a downward direction of the image processing device 200.

Of the side faces of the image processing device 200, a side face where the operation panel 260 is provided, that is, a side face where the operation panel 260 can be operated, is defined as a front face 200a. The front face 200a can also be said to be a forward face of the image processing device 200. Of the side faces of the image processing device 200, a face opposite to the front face 200a is defined as a back face 200b. The back face 200b can also be said to be a rear face of the image processing device 200. The y-axis corresponds to a direction along a forward-backward direction of the image processing device 200, as indicated by an arrow Y. That is, the y-axis corresponds to a direction along a direction from the front face 200a toward the back face 200b. A positive direction along the y-axis corresponds to a direction from the front face 200a toward the back face 200b. A negative direction along the y-axis corresponds to a direction from the back face 200b toward the front face 200a. The forward-backward direction may also be referred to as the direction of depth of the image processing device 200.

The x-axis corresponds to a left-right direction of the image processing device 200 as viewed from the side of the front face 200a as indicated by an arrow F. That is, the x-axis corresponds to the left-right direction of the image processing device 200 as indicated by an arrow X. A positive direction along the x-axis corresponds to a right direction of the image processing device 200 as viewed from the side of the front face 200a. A negative direction along the x-axis corresponds to a left direction of the image processing device 200 as viewed from the side of the front face 200a. The left-right direction can also be referred to as the direction of width of the image processing device 200. The left-right direction of the image processing device 200 also corresponds to the left-right direction of the operation panel 260, that is, the direction of width of the operation panel 260.

In the image processing device 200 according to Embodiment 1, a communication unit 250 is provided within a range corresponding to the operation panel 260 in the left-right direction of the image processing device 200. That is, the communication unit 250 is provided within a range corresponding to the operation panel 260 in the left-right direction as viewed from the side of the front face 200a, where the operation panel 260 can be operated, of the side faces of the image processing device 200. As will be described later, the communication unit 250 has a plurality of antennas. The communication unit 250 is used to communicate with the terminal device 100. The communication unit 250 is implemented, for example, by a wireless substrate. The communication unit 250 may implement a second wireless communication system, described later. Details of this will be described later.

The image processing device 200 performs control for image processing according to direction information acquired based on a radio wave transmitted between the terminal device 100 and the communication unit 250. In other words, the image processing device 200 performs control for image processing according to the position of the terminal device 100 detected based on the radio wave transmitted between the terminal device 100 and the communication unit 250. The direction information is information representing the direction of the terminal device 100 in relation to the image processing device 200. Details of this will be described later.

The terminal device 100 and the image processing device 200 communicate with each other via wireless communication by a first wireless communication system and via wireless communication by a second wireless communication system. The first wireless communication system is a standard with a higher communication speed and a longer communication distance than the second wireless communication system. In a narrow sense, the first wireless communication system is a wireless LAN (local area network), and more specifically, Wi-Fi (trademark registered). In the description below, an example where the first wireless communication system is Wi-Fi is described. However, another communication system may be employed as the first wireless communication system.

The second wireless communication system is a standard with a lower communication speed and a shorter communication distance than the first wireless communication system. Therefore, the second wireless communication system is a standard that implements short-range wireless communication. The second wireless communication system is also a standard that enables transmission of a beacon signal. In a narrow sense, the second wireless communication system is Bluetooth (trademark registered), and more specifically, BLE (Bluetooth Low Energy). In the description below, an example where the second wireless communication system is BLE is described. However, another communication system may be employed as the second wireless communication system. A beacon signal of BLE corresponds to an advertisement packet. Also, the first wireless communication system may enable the transmission of a beacon signal. When the first wireless communication system is Wi-Fi, the image processing device 200 may transmit a beacon signal that notifies a device in the periphery, of the SSID (service set identifier) of the image processing device 200 itself.

FIG. 2 shows an example of the image processing system 1 having a plurality of terminal devices 100. The image processing system 1 may have a plurality of PCs 50. The image processing system 1 may have a plurality of image processing devices 200. The image processing system 1 may have one terminal device 100. That is, the image processing system 1 has at least one terminal device 100.

The image processing device 200 is communicatively connected to the PC 50 via wired or wireless communication. The image processing device 200 is also communicatively connected to at least one terminal device 100 via wireless communication. The foregoing wireless communication may be, for example, by the first wireless communication system.

When the image processing device 200 is communicatively connected to the terminal device 100 via wireless communication, the image processing device 200 may be connected to the terminal device 100 via an access point such as a wireless LAN access point. In this case, when the image processing device 200 operates in an infrastructure mode and is connected to an access point, the terminal device 100 is wirelessly connected to the access point. Thus, the wireless communication between the terminal device 100 and the image processing device 200 is executed. Such connection is referred to as infrastructure connection.

Alternatively, the image processing device 200 may be directly connected to the terminal device 100 without using an access point. In this case, the image processing device 200 activates an internal access point and the terminal device 100 is connected to the internal access point. Thus, the communication between the terminal device 100 and the image processing device 200 is directly executed. Such connection is referred to as direct connection. The direct connection between the terminal device 100 and the image processing device 200 may be made by communication conforming to the WFD (Wi-Fi Direct) standard or may be made using a Wi-Fi ad hoc mode.

The image processing device 200 making direct connection transmits (or broadcasts) a Wi-Fi beacon including the SSID. The Wi-Fi beacon is a beacon signal conforming to the Wi-Fi standard. When the terminal device 100 has received the Wi-Fi beacon, the SSID included in the Wi-Fi beacon is displayed. Also, at this point, the SSID and a password for connection are displayed on the operation panel 260 of the image processing device 200. The user of the terminal device 100 sets the SSID and the password displayed on the operation panel 260 into the user's own terminal device 100. Thus, the terminal device 100 is direct-connected to the image processing device 200.

The PC 50 and the terminal device 100 transmit a job signal Sj including information about a job such as a print job, to the image processing device 200. The job signal Sj includes a job execution instruction to execute the job. The job signal Sj for a print job includes a print instruction to perform printing. The job signal Sj for a print job also includes print data and identification information of the user of the device (PC 50 or terminal device 100) transmitting the job signal Sj. The "print data" is data representing an image to be printed on a paper. The identification information included in the job signal Sj may be identification information of the device (PC 50 or terminal device 100) transmitting the job signal Sj. The job signal Sj may also include information indicating whether to perform authentication processing when executing the job or not.

The image processing device 200 receives the job signal Sj, executes the job relating to the received job signal Sj, and thus performs image processing. When the job signal Sj is for a print job, the image processing device 200 performs printing in such a way as to form an image corresponding to the print data included in the print job onto a print medium such as a paper. The print medium with the image corresponding to the print data formed thereon is discharged to the paper discharge tray 218.

The terminal device 100 also transmits (or broadcasts) a BLE beacon Bb corresponding to the second wireless communication system. The BLE beacon Bb is a beacon signal conforming to the BLE standard. By receiving the BLE beacon Bb, the image processing device 200 can acquire distance information representing the distance from the image processing device 200 to the terminal device 100. By receiving the BLE beacon Bb, the image processing device 200 can also acquire direction information representing the direction of the terminal device 100 in relation to the image processing device 200. Details of this will be described later. The direction information can be acquired, for example, when the image processing device 200 and the terminal device 100 are in conformity with the Bluetooth standard from version 5.1 onward.

Figure 3:
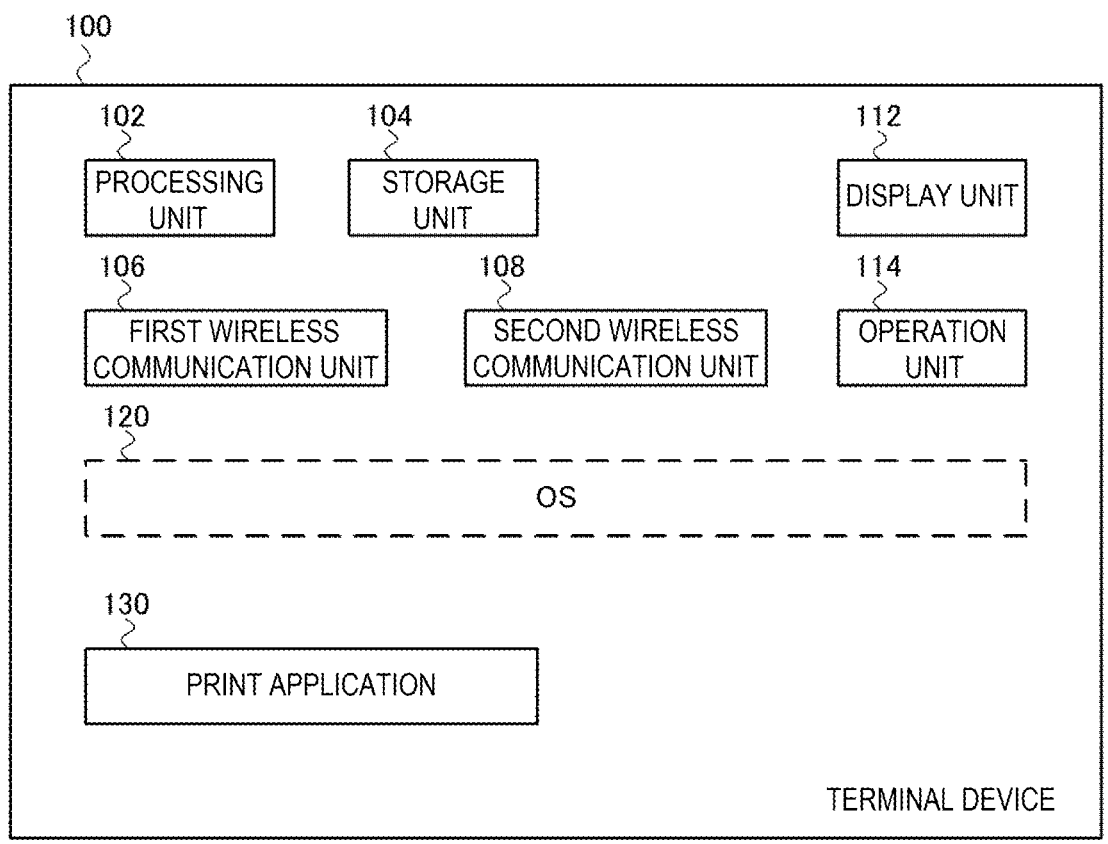
FIG. 3 shows the configuration of a terminal device according to Embodiment 1.

FIG. 3 shows the configuration of the terminal device 100 according to Embodiment 1. The PC 50, too, may have the configuration shown in FIG. 3. The terminal device 100 has a processing unit 102, a storage unit 104, a first wireless communication unit 106, a second wireless communication unit 108, the display unit 112, and an operation unit 114, as a main hardware configuration. The processing unit 102, the storage unit 104, the first wireless communication unit 106, the second wireless communication unit 108, the display unit 112, and the operation unit 114 may be coupled to each other via a data bus or the like.

The processing unit 102 is, for example, a processor such as a CPU (central processing unit). The processing unit 102 may have a plurality of processors. The processing unit 102 has functions as a computing device that performs control processing and computational processing or the like. The processing unit 102 controls the storage unit 104, the first wireless communication unit 106, the second wireless communication unit 108, the display unit 112, and the operation unit 114.

The storage unit 104 is, for example, a storage device such as a memory or a hard disk. The storage unit 104 is, for example, a ROM (read-only memory) or a RAM (random-access memory) or the like. The storage unit 104 has a function for storing a control program and a computation program or the like to be executed by the processing unit 102. The storage unit 104 also has a function for temporarily storing processing data or the like. The storage unit 104 may include a database.

The first wireless communication unit 106 is a wireless communication device that executes wireless communication conforming to the first wireless communication system. The first wireless communication unit 106 executes, for example, wireless communication conforming to the Wi-Fi standard. The first wireless communication unit 106 transmits and receives a radio wave conforming to the first wireless communication system such as the Wi-Fi standard. The second wireless communication unit 108 is a wireless communication device that executes wireless communication conforming to the second wireless communication system. The second wireless communication unit 108 executes, for example, wireless communication conforming to the BLE standard. The second wireless communication unit 108 transmits and receives a radio wave conforming to the second wireless communication system such as the BLE standard. The second wireless communication unit 108 may have a configuration substantially similar to that of the communication unit 250, described later.

The display unit 112 and the operation unit 114 are user interfaces. The display unit 112 is formed of a display or the like that displays various information to the user. The operation unit 114 is formed of a button or the like that accepts an input operation from the user. The display unit 112 and the operation unit 114 may be integrated together into a touch panel or the like.

The terminal device 100 also has an OS 120 (operating system), which is basic software, and a print application 130, as a software configuration. The print application 130 is application software that operates using functions of the OS 120.

The print application 130 can be implemented, for example, by causing a program to be executed under the control of the processing unit 102. More specifically, the print application 130 can be implemented by the processing unit 102 executing the program stored in the storage unit 104. Also, a necessary program may be recorded in any non-volatile recording medium and installed according to need, thus implementing the print application 130.

The print application 130 is not limited to being implemented by program-based software and may also be implemented by a combination of any ones of hardware, firmware, and software, or the like. The print application 130 may also be implemented, for example, using an integrated circuit that is programmable by the user, such as an FPGA (field-programmable gate array) or a microcomputer. In this case, a program formed of the print application 130 may be implemented, using this integrated circuit.

The print application 130 may perform processing to communicatively connect the terminal device 100 and the image processing device 200 to each other. In this case, the print application 130 may control the first wireless communication unit 106 to perform the processing to communicatively connect the terminal device 100 and the image processing device 200 to each other. The print application 130 may also perform processing to transmit the BLE beacon. In this case, the print application 130 may perform processing in such a way as to control the second wireless communication unit 108 to transmit the BLE beacon.

The print application 130 performs control to cause the connected image processing device 200 (printer) to execute printing. When the print application 130 accepts a print instruction based on an operation by the user, the print application 130 performs processing in such a way as to transmit a job signal for a print job including print data, to the connected image processing device 200. In this case, the print application 130 may perform processing in such a way as to control the first wireless communication unit 106 to transmit the job signal.

Figure 4:
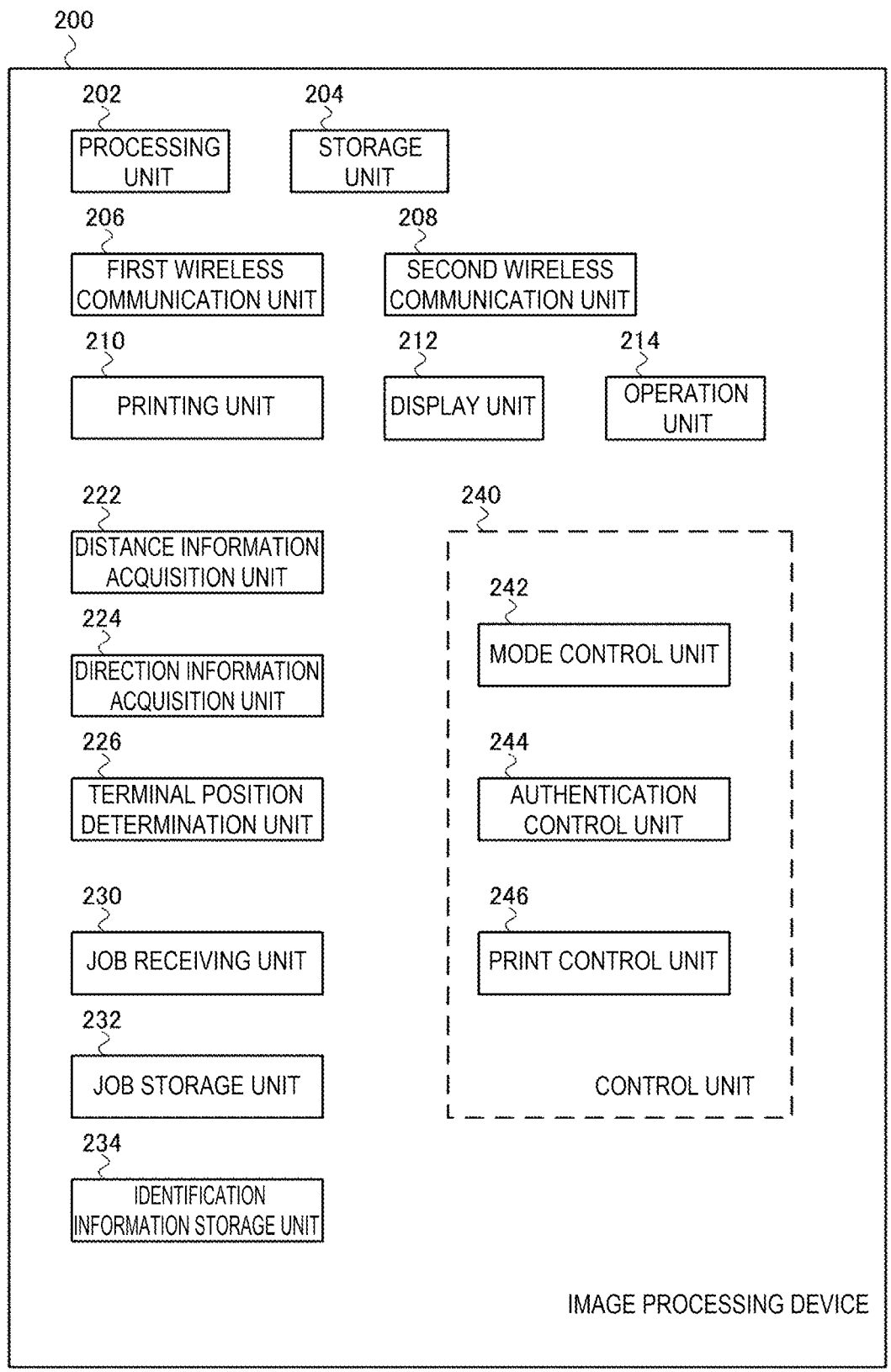
FIG. 4 shows the configuration of an image processing device according to Embodiment 1.

FIG. 4 shows the configuration of the image processing device 200 according to Embodiment 1. FIG. 4 shows a case where the image processing device 200 is a printer. The image processing device 200 has a processing unit 202, a storage unit 204, a first wireless communication unit 206, a second wireless communication unit 208, a printing unit 210, a display unit 212, and an operation unit 214. The processing unit 202, the storage unit 204, the first wireless communication unit 206, the second wireless communication unit 208, the printing unit 210, the display unit 212, and the operation unit 214 may be coupled to each other via a data bus or the like.

The processing unit 202 is, for example, a processor such as a CPU. The processing unit 202 may have a plurality of processors. The processing unit 202 has functions as a computing device that performs control processing and computational processing or the like. The processing unit 202 controls the storage unit 204, the first wireless communication unit 206, the second wireless communication unit 208, the printing unit 210, the display unit 212, and the operation unit 214.

The storage unit 204 is, for example, a storage device such as a memory or a hard disk. The storage unit 204 is, for example, a ROM or a RAM or the like. The storage unit 204 has a function for storing a control program and a computation program or the like to be executed by the processing unit 202. The storage unit 204 also has a function for temporarily storing processing data or the like. The storage unit 204 may include a database.

The first wireless communication unit 206 is a wireless communication device that executes wireless communication conforming to the first wireless communication system. The first wireless communication unit 206 executes, for example, wireless communication conforming to the Wi-Fi standard. The first wireless communication unit 206 transmits and receives a radio wave conforming to the first wireless communication system such as the Wi-Fi standard. The second wireless communication unit 208 is a wireless communication device that executes wireless communication conforming to the second wireless communication system. The second wireless communication unit 208 executes, for example, wireless communication conforming to the BLE standard. The second wireless communication unit 208 transmits and receives a radio wave conforming to the second wireless communication system such as the BLE standard. The second wireless communication unit 208 may be implemented by the communication unit 250, described later. That is, the communication unit 250 can correspond to the second wireless communication unit 208.

The first wireless communication unit 206 of the image processing device 200 making the foregoing direct connection may activate the internal access point according to a predetermined connection setting. In this case, the first wireless communication unit 206 accepts a connection request from the terminal device 100. The connection setting is, for example, the setting of an SSID and a passphrase or the setting of a communication frequency band. The setting of a communication frequency band corresponds to the channel setting.

The printing unit 210 has a print function to form an image on a paper, that is, a print medium. The printing unit 210 includes a print engine. The print engine is a mechanical configuration to execute printing of an image onto a print medium. The print engine may have, for example, a mechanism that performs printing with a toner by an electrophotographic method. Alternatively, the print engine may have, for example, a mechanism that performs printing by an inkjet method. The print engine may also have a conveyor mechanism that conveys the print medium.

The display unit 212 and the operation unit 214 are user interfaces. The display unit 212 is formed of a display or the like that displays various information to the user. The display unit 212 includes an output device such as a display or a speaker. The display unit 212 outputs information to the user. The operation unit 214 is formed of a button or the like that accepts an input operation from the user. The operation unit 214 includes an input device such as a button, a keyboard, a touch panel or a mouse. The operation unit 214 accepts an input of data from the user. The display unit 212 and the operation unit 214 may be integrated together in the form of a touch panel or the like. The display unit 212 and the operation unit 214 may be implemented by the foregoing operation panel 260.

The image processing device 200 also has, as component elements, a distance information acquisition unit 222, a direction information acquisition unit 224, a terminal position determination unit 226, a job receiving unit 230, a job storage unit 232, an identification information storage unit 234, and a control unit 240. The control unit 240 has a mode control unit 242, an authentication control unit 244, and a print control unit 246.

The foregoing component elements can be implemented, for example, by causing a program to be executed under the control of the processing unit 202. More specifically, the component elements can be implemented by the processing unit 202 executing the program stored in the storage unit 204. Also, a necessary program may be recorded in any non-volatile recording medium and installed according to need, thus implementing the component elements.

The component elements are not limited to being implemented by program-based software and may also be implemented by a combination of any ones of hardware, firmware, and software, or the like. The component elements may also be implemented, for example, using an integrated circuit that is programmable by the user, such as an FPGA or a microcomputer. In this case, a program formed of the foregoing component elements may be implemented, using this integrated circuit.

The distance information acquisition unit 222 acquires distance information representing the distance between the terminal device 100 and the image processing device 200, based on a radio wave arriving from the terminal device 100. The distance information acquisition unit 222 acquires the distance information by short-range wireless communication with the terminal device 100. The distance information acquisition unit 222 acquires the distance information, based on a radio wave transmitted between the terminal device 100 and the communication unit 250 (second wireless communication unit 208). Details of this will be described later.

The direction information acquisition unit 224 acquires direction information representing the direction of the terminal device 100 in relation to the image processing device 200, based on the radio wave arriving from the terminal device 100. The direction information acquisition unit 224 acquires the direction information by short-range wireless communication with the terminal device 100. The direction information acquisition unit 224 acquires the direction information, based on the radio wave transmitted between the terminal device 100 and the communication unit 250 (second wireless communication unit 208). Details of this will be described later.

The terminal position determination unit 226 detects the relative position of the terminal device 100 in relation to the image processing device 200, using the distance information and the direction information of the terminal device 100. At this point, the terminal position determination unit 226 detects the relative position of the terminal device 100 in relation to the operation panel 260 of the image processing device 200, using the distance information and the direction information of the terminal device 100. Details of this will be described later.

The terminal position determination unit 226 also determines whether the position of the terminal device 100 is within a predetermined range that is determined in advance in relation to the image processing device 200 or not, using the distance information and the direction information of the terminal device 100. At this point, the terminal position determination unit 226 may determine whether the distance between the terminal device 100 and the image processing device 200 is equal to or shorter than a threshold that is determined in advance or not. Also, at this point, the terminal position determination unit 226 may determine whether the direction of the terminal device 100 in relation to the image processing device 200 is within a predetermined range that is determined in advance or not. Details of this will be described later.

The job receiving unit 230 receives a job signal for a job such as a print job from the terminal device 100 or the PC 50. The job receiving unit 230 may receive the job signal from the terminal device 100 via the first wireless communication unit 206.

The job storage unit 232 stores (or accumulates) job information, which is information about the job relating to the received job signal. At this point, the job storage unit 232 stores the job, establishing the correspondence between the identification information of the job and the identification information of the user giving an instruction to execute the job. That is, the identification information of the user is made to correspond to the job for image processing. The job storage unit 232 stores the job information to be stored, as job accumulation information.

Figure 5:
FIG. 5 shows an example of job accumulation information stored in a job storage unit according to Embodiment 1.

FIG. 5 shows an example of job accumulation information TbJ stored in the job storage unit 232 according to Embodiment 1. As illustrated in FIG. 5, in the job accumulation information TbJ, job identification information, user identification information, and whether it is with or without authentication processing, are corresponded. In this case, the "job identification information" is the identification information of the corresponding job. The "user identification information" is the identification information of the user giving an instruction to execute the corresponding job.

"Whether it is with or without authentication processing" is information indicating whether to perform authentication processing when executing the job or not. That is, with respect to the job for image processing, whether it is with or without authentication processing is designated. In this case, the authentication processing is the processing to check whether the user attempting to use the image processing device 200 coincides with the user giving the instruction to execute the job or not. The authentication processing is executed by determining whether authentication information stored in advance for the user giving the instruction to execute the job coincides with the inputted authentication information of the user or not. For example, a password may be used as the authentication information and the authentication processing may be executed by entering the password. Also, identification information stored on an ID card may be used as the authentication information and the authentication processing may be executed by placing the ID card of the user on a reading device. Also, biometric information such as fingerprint information or facial information may be used as the authentication information and the authentication processing may be executed by biometric authentication such as fingerprint authentication or facial authentication. Alternatively, the authentication processing may be executed by a combination of these techniques.

The job accumulation information TbJ may establish the correspondence between the identification information of the terminal (terminal device 100 or PC 50) transmitting the job signal representing the corresponding job, instead of the user identification information, and the job identification information. When a job is executed, the information about the job that has already been executed may be erased from the job storage unit 232, or a flag indicating "already executed" may be added to the information of the job that has already been executed.

In the example shown in FIG. 5, an instruction to execute a job with job identification information "job A" is given by a user with identification information "user A". The execution of the job with the job identification information "job A" involves authentication processing. An instruction to execute a job with job identification information "job B" is given by a user with identification information "user B". The execution of the job with the job identification information "job B" involves no authentication processing.

The identification information storage unit 234 stores the identification information of a user and the identification information of the device (terminal device 100 or PC 50) owned by the user, establishing the correspondence between these pieces of identification information. The identification information storage unit 234 stores the identification information to be stored, in the form of an identification information table.

Figure 6:
FIG. 6 shows an example of an identification information table stored in an identification information storage unit according to Embodiment 1.

FIG. 6 shows an example of an identification information table TbI stored in the identification information storage unit 234 according to Embodiment 1. As illustrated in FIG. 6, in the identification information table TbI, user identification information and device identification information are corresponded. In this case, the "device identification information" is the identification information of the device owned by the corresponding user. In the example shown in FIG. 6, a user with user identification information "user A" owns a terminal device 100 with device identification information "terminal #1" and a PC 50 with device identification information "PC #1". A user with user identification information "user B" owns a terminal device 100 with device identification information "terminal #2" and a PC 50 with device identification information "PC #2".

The control unit 240 performs control for image processing. That is, the control unit 240 performs processing to perform image processing. The "image processing" includes, for example, print processing and scan processing. The "processing to perform image processing" includes, for example, processing to enable execution of image processing as well as performing processing in such a way as to execute image processing. The "processing to perform image processing" includes, for example, cancellation of a power saving mode, and authentication processing.

The control unit 240 performs the processing to perform image processing, when the position of the terminal device 100 satisfies a predetermined condition. The control unit 240 performs the processing to perform image processing, when the position of the terminal device 100 is within a predetermined range in relation to the image processing device 200. At this point, the control unit 240 according to Embodiment 1 performs control corresponding to at least the direction information. Specifically, the control unit 240 performs the processing to perform image processing, when the direction of the terminal device 100 in relation to the image processing device 200 is within a predetermined range. In this case, in the image processing device 200 according to Embodiment 1, the communication unit 250 is provided within a range corresponding to the operation panel 260 in the left-right direction as viewed from the front face 200*a* side of the image processing device 200. Therefore, the control unit 240 performs the processing to perform image processing, when the direction of the terminal device 100 in relation to the operation panel 260 of the image processing device 200 is within a predetermined range. Details of this will be described later.

The control unit 240 may perform control corresponding to the distance information. The control unit 240 may perform the processing to perform image processing, when the distance between the terminal device 100 and the image processing device 200 is equal to or shorter than a threshold that is determined in advance. In this case, in the image processing device 200 according to Embodiment 1, the communication unit 250 is provided within a range corresponding to the operation panel 260 in the left-right direction as viewed from the front face 200*a* side of the image processing device 200. Therefore, the control unit 240 performs the processing to perform image processing, when the distance between the terminal device 100 and the operation panel 260 is equal to or shorter than a threshold. Also, the control unit 240 may perform the processing to perform image processing, when the distance from the terminal device 100 is equal to or shorter than a threshold and the direction of the terminal device 100 is within a predetermined range. Details of this will be described later.

When the direction of the terminal device 100 in relation to the operation panel 260 is within a predetermined range, the control unit 240 may perform processing to cancel the power saving mode of the operation panel 260. Also, when the direction of the terminal device 100 in relation to the operation panel 260 is within a predetermined range, the control unit 240 may execute the job corresponding to the terminal device 100. In this case, when the job corresponding to the terminal device 100 is a job with authentication processing, the control unit 240 may display a screen to perform authentication processing. The control unit 240 may execute the job when the authentication processing is successful. Details of this will be described later.

The mode control unit 242 performs processing in such a way as to shift to the power saving mode, when no operation of the image processing device 200 is performed for a predetermined time. The mode control unit 242 cancels the power saving mode of the image processing device 200 in a predetermined case. For example, the mode control unit 242 may cancel the power saving mode of the image processing device 200 when the user touches the operation panel 260. Details of this will be described later. The authentication control unit 244 performs processing in such a way as to execute authentication processing when a job with authentication processing is to be executed. Details of this will be described later. The print control unit 246 performs processing in such a way as to execute print processing. That is, the print control unit 246 performs processing in such a way as to execute a print job. Details of this will be described later.

Figure 7:
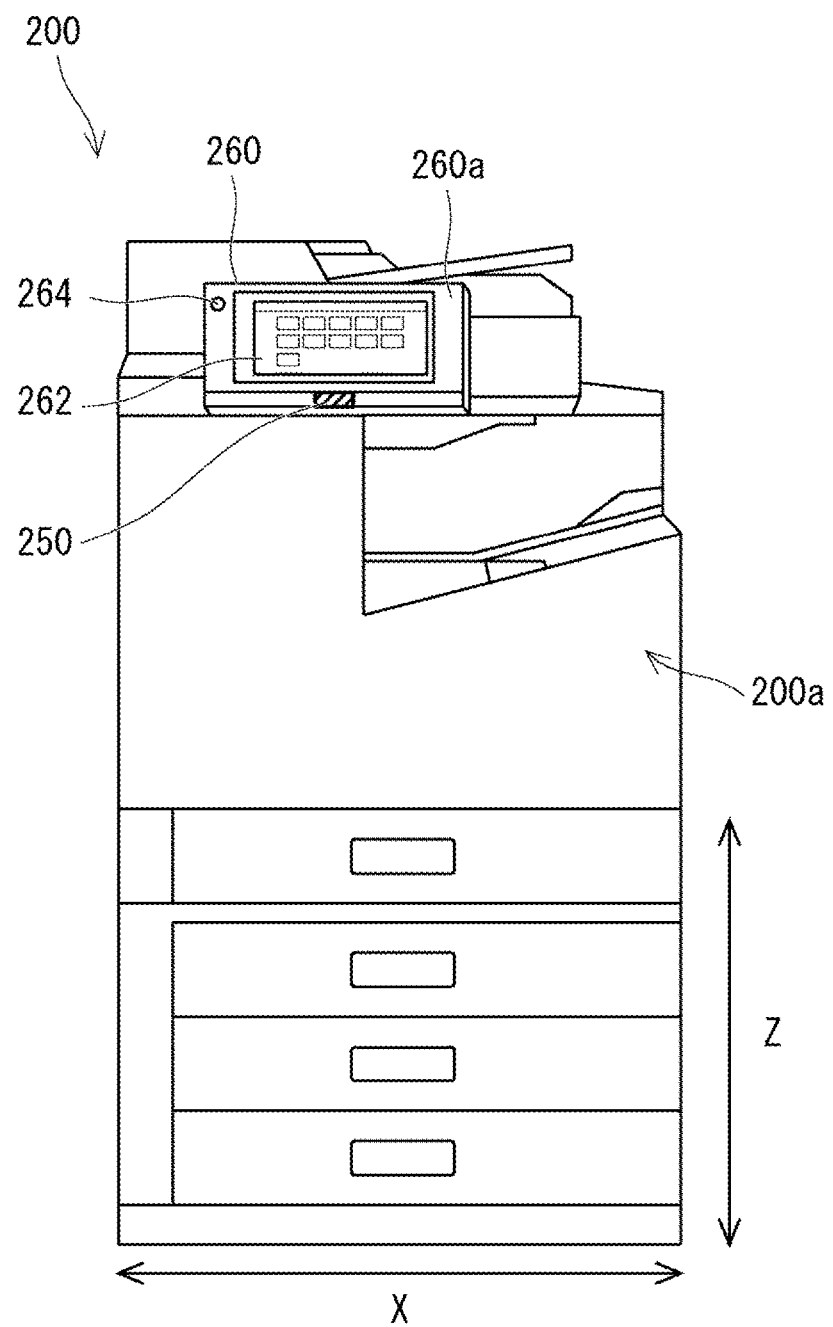
FIG. 7 explains the positional relationship between a communication unit and an operation panel, in the image processing device according to Embodiment 1.
Figure 8:
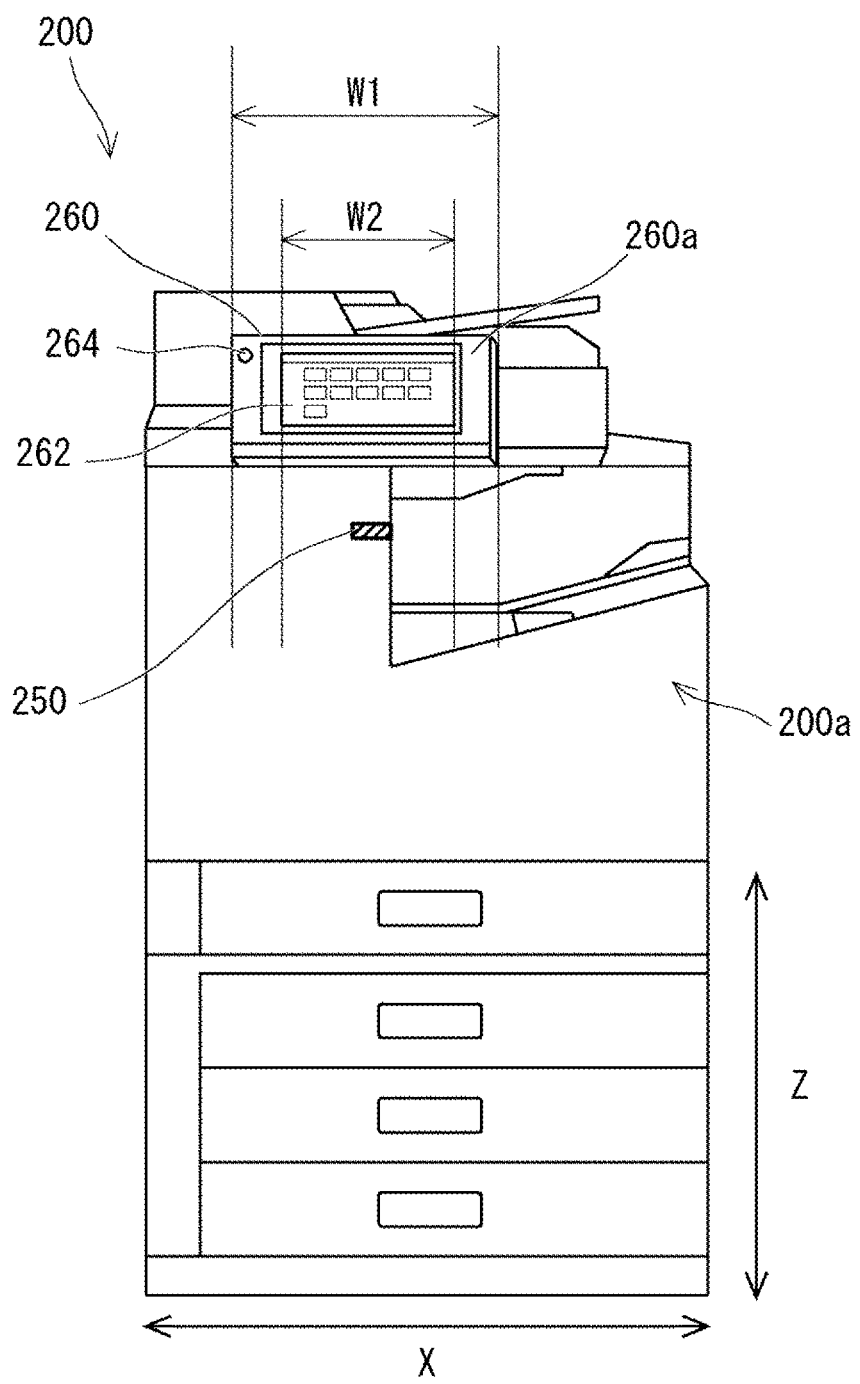
FIG. 8 explains the positional relationship between a communication unit and an operation panel, in the image processing device according to Embodiment 1.

FIGS. 7 and 8 explain the positional relationship between the communication unit 250 and the operation panel 260 in the image processing device 200 according to Embodiment 1. FIGS. 7 and 8 show the image processing device 200 according to Embodiment 1 as viewed from the side of the front face 200*a*. As shown in FIGS. 7 and 8, the communication unit 250 is provided within a range corresponding to the operation panel 260 in the left-right direction of the image processing device 200.

The operation panel 260 has a casing 260*a*, a touch panel 262, and a power button 264. The touch panel 262 and the power button 264 are accommodated in the casing 260*a*. The touch panel 262 is formed of the display unit 212 and the operation unit 214 integrated together. The touch panel 262 accepts an operation from the user and displays information to the user.

The power button 264 is a switch to supply power to the image processing device 200. The power button 264 is a physical button. As the user presses the power button 264 in the state where the power of the image processing device 200 is off, the power of the image processing device 200 turns on.

FIG. 7 shows a first example of the positional relationship between the communication unit 250 and the operation panel 260 in the image processing device 200 according to Embodiment 1. In the first example, the communication unit 250 is provided at the operation panel 260. That is, in the first example, the communication unit 250 is built in the operation panel 260. In other words, in the first example, the communication unit 250 is physically integrated with the operation panel 260. Therefore, the communication unit 250 is provided within a range corresponding to the operation panel 260 in the left-right direction of the image processing device 200 as indicated by an arrow X. For example, the communication unit 250 may be provided at a lower part of the touch panel 262 in the operation panel 260. Also, for example, the communication unit 250 may be provided at a position on the back side of the touch panel 262 in the operation panel 260.

In this example, preferably, the communication unit 250 may be provided near the center in the left-right direction of the operation panel 260. That is, preferably, the communication unit 250 may be provided near the center in the left-right direction of the touch panel 262. In other words, preferably, the communication unit 250 may be provided at a position including the center position of the touch panel 262 in the left-right direction as indicated by the arrow X. Also, the communication unit 250 may be provided in such a way that the center of the communication unit 250 and the center of the operation panel 260 coincide with each other in the left-right direction indicated by the arrow X.

FIG. 8 shows a second example of the positional relationship between the communication unit 250 and the operation panel 260 in the image processing device 200 according to Embodiment 1. In the second example, the communication unit 250 is provided below the operation panel 260 in the up-down direction of the image processing device 200. In other words, the communication unit 250 is provided at a position within a range corresponding to the operation panel 260 in the left-right direction indicated by an arrow X and below the operation panel 260 in the up-down direction indicated by an arrow Z. That is, in the second example, the communication unit 250 is provided physically separately from the operation panel 260.

The communication unit 250 is provided at least within a range W1 in the left-right direction of the operation panel 260, in the left-right direction indicated by the arrow X. More preferably, the communication unit 250 is provided within a range W2 in the left-right direction of the touch panel 262, in the left-right direction indicated by the arrow X. Therefore, the communication unit 250 is provided within a range corresponding to the operation panel 260 in the left-right direction of the image processing device 200 as indicated by the arrow X. In terms of the front-back direction of the image processing device 200 (direction indicated by the arrow Y in FIG. 1), the communication unit 250 may be not provided within a range corresponding to the operation panel 260.

In this example, preferably, the communication unit 250 may be provided near the center in the left-right direction of the operation panel 260, at a position below the operation panel 260. That is, preferably, the communication unit 250 may be provided near the center in the left-right direction of the touch panel 262, at a position below the operation panel 260. In other words, preferably, the communication unit 250 may be provided at a position including the center position in the left-right direction of the touch panel 262, at a position below the operation panel 260. To paraphrase this further, preferably, the communication unit 250 may be provided at a position including the center position of the range W2 in terms of the left-right direction, at a position below the operation panel 260. Also, the communication unit 250 may be provided in such a way that the center in the left-right direction of the communication unit 250 and the center in the left-right direction of the operation panel 260 coincide with each other at a position below the operation panel 260.

Figure 9:
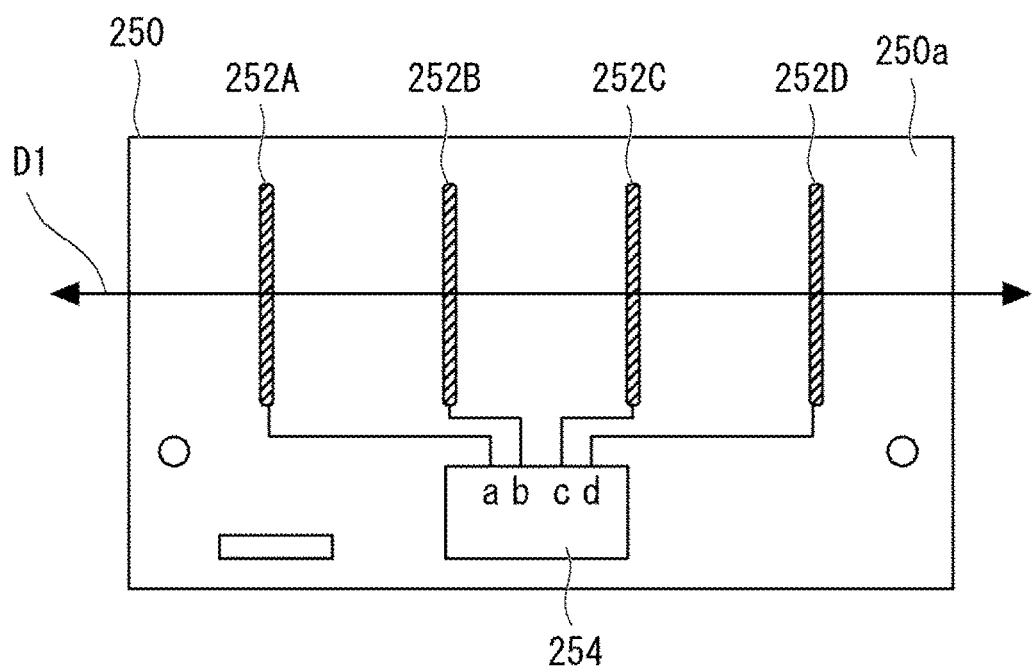
FIG. 9 shows the configuration of the communication unit according to Embodiment 1.

FIG. 9 shows the configuration of the communication unit 250 according to Embodiment 1. The communication unit 250 has a plurality of antennas 252A to 252D and an IC (integrated circuit) chip 254. The plurality of antennas 252 and the IC chip 254 are formed at a substrate 250*a*. The antennas 252 may be BLE antennas used for wireless communication conforming to the BLE standard. The antennas 252 transmit and receive a radio wave conforming to the BLE standard. While FIG. 9 shows the communication unit 250 having four antennas 252, the communication unit 250 may have any number equal to or greater than 2 of antennas 252.

The IC chip 254 performs control in such a way as to perform communication conforming to the BLE standard (wireless communication conforming to the second wireless communication system), using the antennas 252. For example, the IC chip 254 may perform modulation and demodulation processing and baseband signal processing of a radio wave. The IC chip 254 has contact points a, b, c, d with the antennas 252A, 252B, 252C, 252D, respectively. The IC chip 254 switches the coupling of the contact points and thus switches the antenna 252 to be used.

The antennas 252A, 252B, 252C, 252D are formed, arrayed in a direction along an arrow D1 at the substrate 250*a*. That is, the direction indicated by the arrow D1 is the direction in which the plurality of antennas 252A, 252B, 252C, 252D are arrayed. In this case, the communication unit 250 may be provided in such a way that the direction in which the antennas 252 are arrayed as indicated by the arrow D1 is laid along the left-right direction of the image processing device 200. That is, the communication unit 250 may be provided in such a way that the direction in which the antennas 252 are arrayed as indicated by the arrow D1 is laid along the left-right direction of the operation panel 260.

Figure 10:
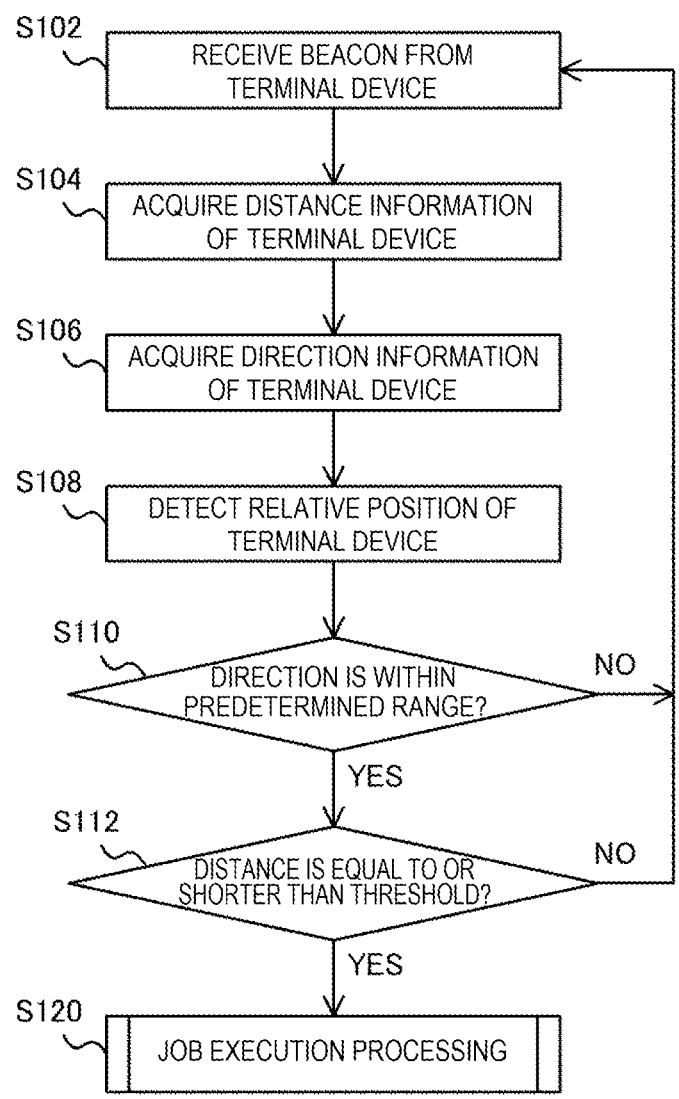
FIG. 10 is a flowchart showing processing executed by the image processing device according to Embodiment 1.
Figure 11:
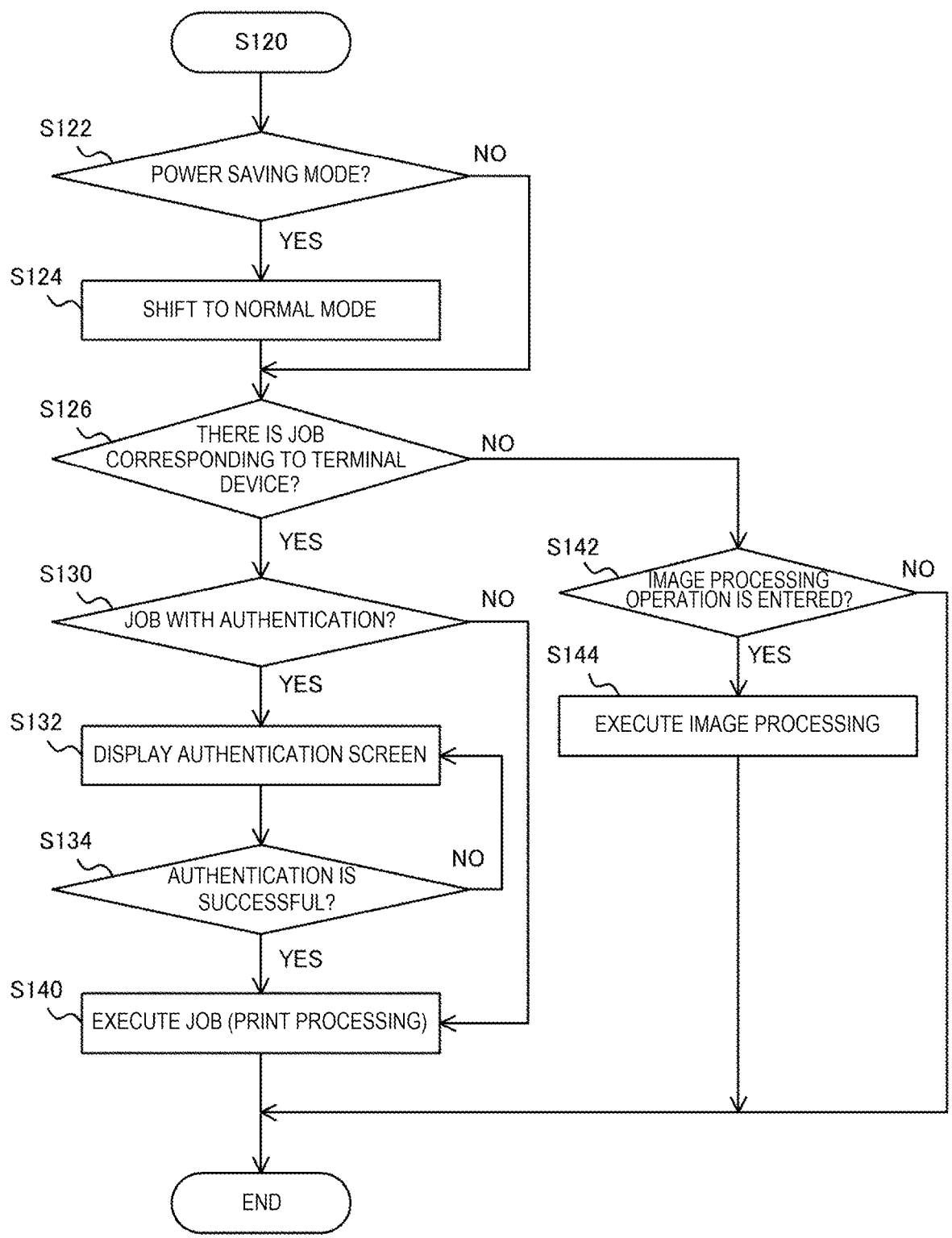
FIG. 11 is a flowchart showing processing executed by the image processing device according to Embodiment 1.

FIGS. 10 and 11 are flowcharts showing processing executed by the image processing device 200 according to Embodiment 1. The flowcharts shown in FIGS. 10 and 11 correspond to a control method executed by the image processing device 200. When the job receiving unit 230 receives a job signal from the terminal device 100 or the PC 50 during steps S102 to S112, described later, the information of the job relating to the received job signal is stored and accumulated in the job storage unit 232.

The image processing device 200 receives a beacon from the terminal device 100 (step S102). Specifically, the second wireless communication unit 208 receives a radio wave of the BLE beacon Bb transmitted from the terminal device 100. That is, the antenna 252 of the communication unit 250 receives the radio wave of the BLE beacon Bb transmitted from the terminal device 100. The BLE beacon Bb transmitted from the terminal device 100 includes the identification information of the terminal device 100. Therefore, the image processing device 200 receives the identification information of the terminal device 100 in the processing of S102. The terminal device 100 can transmit the beacon at a predetermined time interval. Therefore, the subsequent processing can be executed every time the image processing device 200 receives the beacon from the terminal device 100.

The distance information acquisition unit 222 acquires the distance information of the terminal device 100 (step S104). As described above, the distance information acquisition unit 222 acquires the distance information representing the distance between the terminal device 100 and the image processing device 200, based on the radio wave arriving from the terminal device 100. Specifically, the distance information acquisition unit 222 acquires the distance information of the terminal device 100 by short-range wireless communication such as BLE or Bluetooth.

More specifically, the distance information acquisition unit 222 acquires radio wave intensity information representing the radio wave intensity of the received BLE beacon Bb. The radio wave intensity information can correspond to the received radio wave intensity or the received signal intensity. The distance information acquisition unit 222 estimates the distance between the image processing device 200 and the terminal device 100, using the radio wave intensity information.

That is, as the radio wave intensity of the BLE beacon Bb becomes higher, the distance between the terminal device 100 transmitting this BLE beacon Bb and the image processing device 200 becomes shorter. On the other hand, as the radio wave intensity of the BLE beacon Bb becomes lower, the distance between the terminal device 100 transmitting this BLE beacon Bb and the image processing device 200 becomes longer. For example, in the case of iBeacon (trademark registered), which is a BLE standard, the range to which a beacon signal is transmitted can be set from among three types, that is, "immediate" (proximate), "near" (close), and "far" (distant). For example, "immediate" corresponds to a distance of approximately several centimeters, "near" corresponds to a distance of approximately several meters, and "far" corresponds to a distance of approximately 10 meters. In this way, the distance information acquisition unit 222 acquires the distance information representing the distance between the image processing device 200 and the terminal device 100.

Alternatively, the distance information acquisition unit 222 may compute the distance between the terminal device 100 transmitting the BLE beacon Bb and the image processing device 200, based on the radio wave intensity of the BLE beacon Bb. Generally, the radio wave intensity is known to be in inverse proportion to the square of the distance. Therefore, if the radio wave intensity at a reference distance is known, the distance between the image processing device 200 and the terminal device 100 can be computed, based on the radio wave intensity of the BLE beacon Bb that is actually received. In this case, the BLE beacon Bb is configured to include reference radio wave intensity information. The distance information acquisition unit 222 computes the distance between the image processing device 200 and the terminal device 100, based on the reference radio wave intensity information and the radio wave intensity information. Thus, the distance information acquisition unit 222 acquires the distance information representing the distance between the image processing device 200 and the terminal device 100.

The distance information represents the distance between the terminal device 100 and the communication unit 250. As described above, the communication unit 250 is provided within a range corresponding to the operation panel 260 in the left-right direction. Therefore, the distance information can represent the distance between the operation panel 260 and the terminal device 100.

The direction information acquisition unit 224 acquires the direction information of the terminal device 100 (step S106). As described above, the direction information acquisition unit 224 acquires the direction information representing the direction of the terminal device 100 in relation to the image processing device 200, based on the radio wave arriving from the terminal device 100. Specifically, the direction information acquisition unit 224 acquires the direction information of the terminal device 100 by short-range wireless communication such as BLE or Bluetooth. The direction information represents the direction of the terminal device 100 in relation to the communication unit 250. As described above, the communication unit 250 is provided within a range corresponding to the operation panel 260 in the left-right direction. Therefore, the direction information can represent the direction of the terminal device 100 in relation to the operation panel 260.

More specifically, the direction information acquisition unit 224 acquires the direction information representing the direction of the terminal device 100 in relation to the image processing device 200, using a direction detection function defined by the Bluetooth standard from version 5.1 onward. The direction information acquisition unit 224 calculates the angle of reception, that is, the angle of arrival (AoA), of the radio wave in the image processing device 200 with respect to the BLE beacon Bb transmitted from the terminal device 100, by an AoA system in the direction detection function. As described above, the communication unit 250 has a plurality of antennas 252 for the second wireless communication unit 208. The communication unit 250 receives the radio wave, that is, the BLE beacon Bb, via the plurality of antennas 252. The direction information acquisition unit 224 of the image processing device 200 calculates the angle of arrival AoA, which is an angle in relation to the direction in which the plurality of antennas 252 are arrayed (direction indicated by the arrow D1 in FIG. 9), based on the distance between the plurality of antennas 252 and the phase difference in the radio wave received by the plurality of antennas 252. The angle of arrival AoA corresponds to the direction of the terminal device 100 in relation to the communication unit 250 of the image processing device 200. As described above, the communication unit 250 is provided within a range corresponding to the operation panel 260 in the left-right direction. Therefore, the angle of arrival AoA can represent the direction of the terminal device 100 in relation to the operation panel 260.

Alternatively, the direction information acquisition unit 224 may acquire the direction information representing the direction of the terminal device 100 in relation to the image processing device 200, using a BLE beacon transmitted from the image processing device 200. Specifically, the terminal device 100 detects the angle of transmission, that is, the angle of departure AoD, of the radio wave in the image processing device 200 with respect to the BLE beacon transmitted from the image processing device 200, by an AoD system in the direction detection function. As described above, the communication unit 250 has a plurality of antennas 252 for the second wireless communication unit 208. The communication unit 250 emits the radio wave, that is, the BLE beacon, from the plurality of antennas 252. The terminal device 100 calculates the angle of departure AoD, which is an angle in relation to the direction in which the plurality of antennas 252 are arrayed (direction indicated by the arrow D1 in FIG. 9), based on the distance between the plurality of antennas 252 and the phase difference in the radio wave transmitted from the plurality of antennas 252. It is assumed that information representing the distance between the plurality of antennas 252 and information representing the timing of transmitting the radio wave from the plurality of antennas 252 are given to the terminal device 100 in advance. These pieces of information may be included in the BLE beacon. The terminal device 100 then transmits a radio wave (BLE beacon or the like) representing the angle of departure AoD to the image processing device 200. The angle of departure AoD corresponds to the direction of the terminal device 100 in relation to the image processing device 200. The direction information acquisition unit 224 may thus acquire the direction information representing the direction of the terminal device 100 in relation to the communication unit 250 of the image processing device 200. As described above, the communication unit 250 is provided within a range corresponding to the operation panel 260 in the left-right direction. Therefore, the angle of departure AoD can represent the direction of the terminal device 100 in relation to the operation panel 260.

In this way, the direction information acquisition unit 224 acquires an angle α corresponding to the direction of the terminal device 100 in relation to the communication unit 250 of the image processing device 200. The angle α corresponds to the angle of the direction of the terminal device 100 (angle of arrival AoA or angle of departure AoD) in relation to the direction in which the plurality of antennas 252 are arrayed (direction indicated by the arrow D1 in FIG. 9). As described above, the communication unit 250 is provided within a range corresponding to the operation panel 260 in the left-right direction. The direction in which the plurality of antennas 252 are arrayed can correspond to the left-right direction of the operation panel 260. Therefore, the angle α can correspond to the angle of the direction of the terminal device 100 (angle of arrival AoA or angle of departure AoD) in relation to the left-right direction of the operation panel 260.

The terminal position determination unit 226 detects the relative position of the terminal device 100 in relation to the image processing device 200 (step S108). Specifically, the terminal position determination unit 226 detects the relative position of the terminal device 100 in relation to the operation panel 260 of the image processing device 200, using the distance information and the direction information, as illustrated in FIG. 12.

Figure 12:
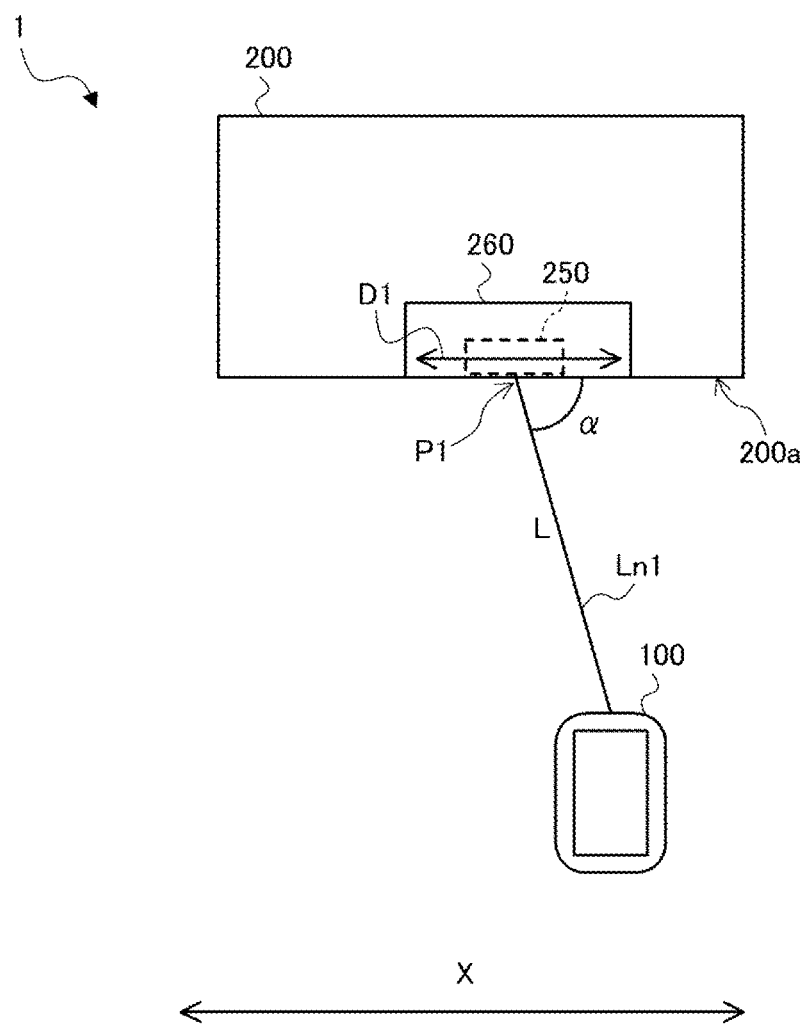
FIG. 12 explains the positional relationship between the image processing device and the terminal device according to Embodiment 1.

FIG. 12 explains the positional relationship between the image processing device 200 and the terminal device 100 according to Embodiment 1. The illustration of the image processing device 200 shown in FIG. 12 is a schematic view of the image processing device 200 as viewed from above.

As described above, the communication unit 250 is provided with a plurality of antennas 252 for transmitting and receiving a radio wave such as a BLE beacon. Therefore, the distance information acquired in the processing of S104 may represent the distance between a reference position P1 prescribed by the communication unit 250 of the image processing device 200, and the terminal device 100. The direction information acquired in the processing of S106 may represent the direction of the terminal device 100 in relation to the reference position P1 prescribed by the communication unit 250 of the image processing device 200.

It is assumed that the communication unit 250 and the terminal device 100 are connected together by a line Ln1, as shown in FIG. 12. The line Ln1 is assumed to connect the reference position P1 on the communication unit 250 and a reference position on the terminal device 100. Also, as described above, the plurality of antennas 252 of the communication unit 250 are arrayed in the left-right direction as viewed from the side of the front face 200a of the image processing device 200 (direction indicated by the arrow D1). In this case, the angle α of the line Ln1 in relation to the direction in which the plurality of antennas 252 are arrayed corresponds to the direction of the terminal device 100 in relation to the communication unit 250 of the image processing device 200, that is, the direction information. The length L of the line Ln1 corresponds to the distance between the image processing device 200 (communication unit 250) and the terminal device 100.

As described above, the communication unit 250 is provided within a range corresponding to the operation panel 260 in the left-right direction of the image processing device 200. Therefore, the length of the line Ln1 can correspond to the distance between the operation panel 260 and the terminal device 100. The communication unit 250 can be arranged in such a way that the direction in which the plurality of antennas 252 are arrayed is laid along the left-right direction of the operation panel 260. Therefore, the angle α can correspond to the direction of the terminal device 100 in relation to the left-right direction of the operation panel 260. Thus, the terminal position determination unit 226 according to Embodiment 1 can accurately detect the relative position of the terminal device 100 in relation to the operation panel 260.

Referring back to FIG. 10, the terminal position determination unit 226 determines whether the position of the terminal device 100 is within a predetermined range in relation to the image processing device 200 or not, using the distance information and the direction information of the terminal device 100 (steps S110, S112). The "predetermined range" corresponds to an area that is regarded to be in the vicinity of the front of the image processing device 200. Therefore, in the processing of S110 and S112, the terminal position determination unit 226 determines whether the position of the terminal device 100 (terminal position) is in the vicinity of the front of the image processing device 200 or not.

The "predetermined range" corresponds to an area including a position where the user can operate the operation panel 260 of the image processing device 200. That is, the "predetermined range" can correspond to an area in the vicinity of the operation panel 260. The "predetermined range" can be prescribed by the direction in relation to the reference position on the image processing device 200. The "predetermined range" can also be prescribed by the distance from the reference position on the image processing device 200. The "predetermined range" can also be prescribed by the direction in relation to the reference position on the image processing device 200 and the distance from the reference position. As described above, the reference position can be defined by the position of the communication unit 250 having the plurality of antennas 252. As described above, the communication unit 250 is provided within a range corresponding to the operation panel 260 in the left-right direction of the image processing device 200. Therefore, the reference position can be defined by the position of the operation panel 260.

Figure 13:
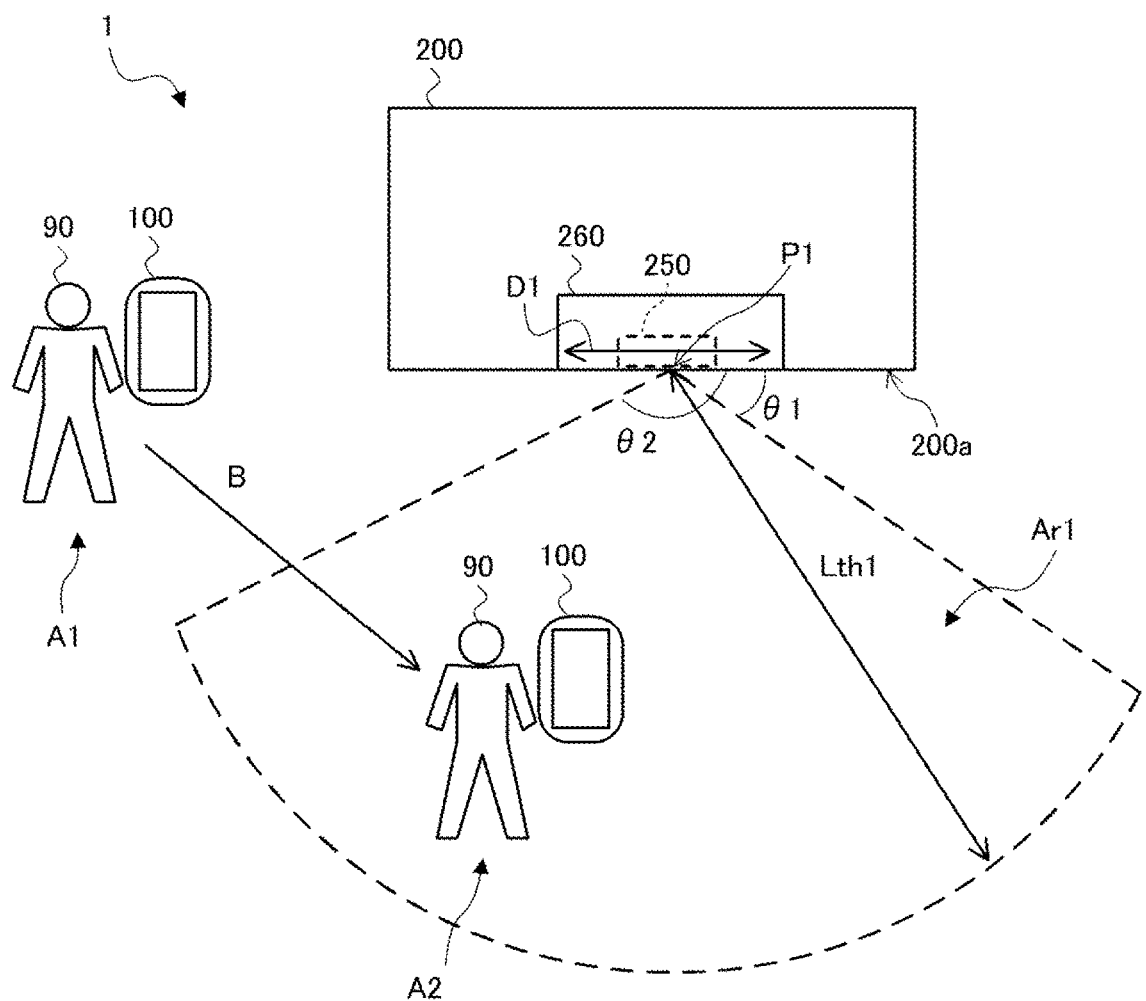
FIG. 13 explains a predetermined range in relation to the image processing device according to Embodiment 1.

FIG. 13 explains the predetermined range in relation to the image processing device 200 according to Embodiment 1. In FIG. 13, a predetermined range Ar1 in relation to the image processing device 200 is shown as an area surrounded by a dashed line. The predetermined range Ar1 is prescribed on the side of the front face 200a of the image processing device 200. The predetermined range Ar1 is also prescribed in relation to the reference position P1 corresponding to the communication unit 250. As described above, the communication unit 250 is provided within a range corresponding to the operation panel 260 in the left-right direction of the image processing device 200. Therefore, the predetermined range Ar1 is prescribed in relation to the reference position P1 corresponding to the operation panel 260.

In the example shown in FIG. 13, the predetermined range Ar1 is an area extending to a distance equal to or shorter than a threshold Lth1 from the reference position P1. The predetermined range Ar1 is also an area extending in a direction ranging from an angle θ1 or greater and an angle θ2 or smaller from the front face 200a at the reference position P1. That is, the predetermined range Ar1 is an area such that an angle θr corresponding to the direction in relation to the direction in which the plurality of antennas 252 are arrayed (direction indicated by the arrow D1), based on the reference position P1, is equal to or greater than the angle θ1 and equal to or smaller than the angle θ2. In other words, the predetermined range Ar1 is an area that satisfies θ1≤θr≤θ2. Lth1, θ1, and θ2 can be suitably set in such a way that the "predetermined range" is regarded as an area in the vicinity of the operation panel 260. Also, Lth1, θ1, and θ2 can be suitably set in such a way that the "predetermined range" includes an area where the user can operate the operation panel 260.

In the example shown in FIG. 13, the terminal position determination unit 226 determines whether the distance L represented by the distance information of the terminal device 100 is equal to or shorter than the threshold Lth1 and the angle α represented by the direction information of the terminal device 100 is equal to or greater than the angle θ1 and equal to or smaller than the angle θ2, or not. When the result of this determination is positive, the terminal position determination unit 226 determines that the position of the terminal device 100 is within the predetermined range Ar1. Meanwhile, when the result of the determination is negative, the terminal position determination unit 226 determines that the position of the terminal device 100 is not within the predetermined range Ar1.

When a user 90 holding the terminal device 100 is not located within the predetermined range Ar1, as indicated by an arrow A1 in FIG. 13, the terminal position determination unit 226 determines that the position of the terminal device 100 is not within the predetermined range Ar1. Meanwhile, when the user 90 holding the terminal device 100 moves as indicated by an arrow B into the predetermined range Ar1, as indicated by an arrow A2 in FIG. 13, the terminal position determination unit 226 determines that the position of the terminal device 100 is within the predetermined range Ar1.

Referring back to FIG. 10, the terminal position determination unit 226 determines whether the direction represented by the direction information is within a predetermined range or not (step S110). When the direction is not within the predetermined range (NO in S110), it can be regarded that the terminal device 100 is not located in the vicinity of the operation panel 260. Therefore, the processing flow returns to S102. Meanwhile, when the direction is within the predetermined range (YES in S110), the terminal position determination unit 226 determines whether the distance represented by the distance information is equal to or shorter than a threshold that is determined in advance, or not (step S112). When the distance is not equal to or shorter than the threshold (NO in S112), it can be regarded that the terminal device 100 is not located in the vicinity of the operation panel 260. Therefore, the processing flow returns to S102. Meanwhile, when the distance is equal to or shorter than the threshold (YES in S112), the terminal position determination unit 226 determines that the terminal device 100 is within the predetermined range. That is, the terminal device 100 can be regarded to be located in the vicinity of the operation panel 260. In this case, the control unit 240 performs job execution processing (step S120).

The predetermined range Ar1 illustrated in FIG. 13 is prescribed by the direction in relation to the reference position P1 and the distance from the reference position P1. However, the predetermined range Ar1 is not limited to such a configuration. The predetermined range Ar1 may be prescribed by only the distance from the reference position P1.

In this case, the terminal position determination unit 226 determines whether the distance L represented by the distance information of the terminal device 100 is equal to or shorter than the threshold Lth1 or not. When the result of this determination is positive, the terminal position determination unit 226 determines that the position of the terminal device 100 is within the predetermined range Ar1. Meanwhile, when the result of the determination is negative, the terminal position determination unit 226 determines that the position of the terminal device 100 is not within the predetermined range Ar1. In this case, the processing of S110 can be omitted.

Alternatively, the predetermined range Ar1 may be prescribed by only the direction in relation to the reference position P1. In this case, the terminal position determination unit 226 determines whether the angle α represented by the direction information of the terminal device 100 is equal to or greater than the angle θ1 and equal to or smaller than the angle θ2, or not. When the result of this determination is positive, the terminal position determination unit 226 determines that the position of the terminal device 100 is within the predetermined range Ar1. Meanwhile, when the result of the determination is negative, the terminal position determination unit 226 determines that the position of the terminal device 100 is not within the predetermined range Ar1. In this case, the processing of S112 can be omitted.

FIG. 11 shows the job execution processing (S120) executed by the control unit 240 according to Embodiment 1. The mode control unit 242 of the control unit 240 determines whether the image processing device 200 is in the power saving mode or not (step S122). The "power saving mode" is a mode for restraining the power consumption of the image processing device 200. In the power saving mode, for example, the display on the operation panel 260 may be deleted. The power saving mode may also be implemented in the form of switching off the backlight of the operation panel 260. In the power saving mode, for example, electric power may not be supplied to the printing unit 210. In the power saving mode, the control unit 240 and the printing unit 210 of the image processing device 200 may be turned into a standby state and thus turned into a lower power supply state.

When the image processing device 200 is in the power saving mode (YES in S122), the mode control unit 242 cancels the power saving mode of the image processing device 200 and shifts to the normal mode (step S124). In the normal mode, electric power can be supplied to each device in the image processing device 200. Meanwhile, when the image processing device 200 is not in the power saving mode (NO in S122), the mode control unit 242 skips the processing of S124. Cancelling the power saving mode enables the user to immediately perform an operation when operating the operation panel 260. Also, cancelling the power saving mode enables the image processing device 200 to immediately execute a job of the user holding the terminal device 100 when this user approaches the operation panel 260.

The control unit 240 determines whether there is a job relating to the terminal device 100 or not (step S126). Specifically, the control unit 240 determines whether there is a job relating to the user of the terminal device 100 that is in the predetermined range or not, referring to the job accumulation information TbJ stored in the job storage unit 232 and the identification information table TbI stored in the identification information storage unit 234. More specifically, the control unit 240 determines whether a job relating to the identification information of the user corresponding to the identification information of the terminal device 100 that is in the predetermined range is accumulated or not.

When there is a job corresponding to the terminal device 100 (YES in S126), the control unit 240 determines whether the job is a job with authentication processing or not (step S130). Specifically, the control unit 240 determines whether authentication processing is to be performed or not, referring to the job accumulation information TbJ. When the job is not a job with authentication processing (NO in S130), the print control unit 246 execute the processing of S140, described later.

Meanwhile, when the job is a job with authentication processing (YES in S130), the authentication control unit 244 performs control in such a way that an authentication screen is displayed (step S132). Specifically, the authentication control unit 244 performs control in such a way that the operation panel 260 displays the authentication screen. The authentication screen is a screen for the user to perform authentication. When the authentication processing is to be performed by entering a password, the authentication screen may display a message prompting the user to enter the password. When the authentication processing is to be performed by reading an ID card, the authentication screen may display a message prompting the user to place the ID card on the reading device. When the authentication processing is to be performed by fingerprint authentication, the authentication screen may display a message prompting the user to move a finger toward a fingerprint reading device.

The authentication control unit 244 determines whether the authentication is successful or not (step S134). Specifically, the authentication control unit 244 determines whether authentication information stored in advance for the user giving the instruction to execute the job coincides with the inputted authentication information of the user or not. When the authentication information stored in advance for the user giving the instruction to execute the job coincides with the inputted authentication information of the user, the authentication control unit 244 determines that the authentication is successful.

When the authentication is successful (YES in step S134), the print control unit 246 executes the job (step S140). That is, the print control unit 246 executes print processing for the job. Specifically, the print control unit 246 controls the printing unit 210 in such a way that print data relating to the job to be executed is formed on a print medium.

Meanwhile, when there is no job relating to the terminal device 100 in the processing of S126 (NO in S126), the control unit 240 determines whether an operation for image processing is entered or not (step S142). Specifically, the control unit 240 determines whether an operation for image processing such as copying or scanning is entered to the operation panel 260. When an operation for image processing is entered (YES in S142), the control unit 240 executes image processing corresponding to the content of the operation (step S144). Meanwhile, when an operation for image processing is not entered (NO in S142), the processing ends.

As described above, in the image processing device 200 according to Embodiment 1, the communication unit 250 is provided within a range corresponding to the operation panel 260 in the left-right direction of the image processing device 200. Thus, the relative position of the terminal device 100 in relation to the operation panel 260 can be accurately detected. Therefore, whether the terminal device 100 is located within a predetermined range prescribed in relation to the operation panel 260 or not can be accurately determined. That is, whether the terminal device 100 is located in the vicinity of the operation panel 260 or not can be accurately determined. Therefore, control according to the position of the terminal device 100 in relation to the operation panel 260 can be accurately performed. Thus, the convenience for the user is improved.

In the image processing device 200 according to Embodiment 1, the communication unit 250 may be provided at the operation panel 260. According to such a configuration, the communication unit 250 can be easily provided within a range corresponding to the operation panel 260 in the left-right direction of the image processing device 200. Thus, the relative position of the terminal device 100 in relation to the operation panel 260 can be accurately detected more securely. Therefore, whether the terminal device 100 is located within a predetermined range prescribed in relation to the operation panel 260 or not can be determined more accurately. That is, whether the terminal device 100 is located in the vicinity of the operation panel 260 or not can be determined more accurately. Therefore, control according to the position of the terminal device 100 in relation to the operation panel 260 can be performed more accurately. Thus, the convenience for the user is improved further.

In the image processing device 200 according to Embodiment 1, the communication unit 250 may be provided below the operation panel 260 in the up-down direction of the image processing device 200. That is, the communication unit 250 may be provided within a range corresponding to the operation panel 260 in the left-right direction and below the operation panel 260. According to such a configuration, even when the communication unit 250 cannot be provided at the operation panel 260 for a reason such as the lack of a space for providing the communication unit 250 at the operation panel 260, the communication unit 250 can be provided within a range corresponding to the operation panel 260 in the left-right direction of the image processing device 200. Thus, the relative position of the terminal device 100 in relation to the operation panel 260 can be accurately detected regardless of the structure of the operation panel 260. Therefore, whether the terminal device 100 is located within a predetermined range prescribed in relation to the operation panel 260 or not can be accurately determined regardless of the structure of the operation panel 260. That is, whether the terminal device 100 is located in the vicinity of the operation panel 260 or not can be accurately determined regardless of the structure of the operation panel 260. Therefore, control according to the position of the terminal device 100 in relation to the operation panel 260 can be accurately performed regardless of the structure of the operation panel 260. Thus, the convenience for the user is improved further.

In Embodiment 1, the control unit 240 may perform processing to cancel the power saving mode of the image processing device 200 when the direction of the terminal device 100 in relation to the operation panel 260 is within a predetermined range that is determined in advance. According to such a configuration, the power saving mode can be immediately canceled when the position of the terminal device 100 is within a predetermined range. Therefore, even when the image processing device 200 is in the power saving mode, the user can immediately operate the operation panel 260 when approaching the operation panel 260. Thus, the convenience for the user is improved.

In Embodiment 1, the direction of the image processing device 200 may be displayed at the terminal device 100. Thus, the user of the terminal device 100 can grasp the position of the image processing device 200. In such a case, too, the effect of the provision of the communication unit 250 within a range corresponding to the operation panel 260 in the left-right direction is achieved, as will be described later.

The case where the direction of the image processing device 200 is displayed at the terminal device 100 will now be described. In this case, the terminal device 100 can have a direction detection function, similarly to the image processing device 200. In this case, the terminal device 100 has a configuration substantially similar to the configuration of the communication unit 250. That is, the terminal device 100 has a plurality of antennas. The second wireless communication unit 208 of the image processing device 200 transmits a BLE beacon. The terminal device 100 acquires direction information representing the direction of the image processing device 200 in relation to the terminal device 100, using the direction detection function.

The terminal device 100 calculates the angle of reception, that is, the angle of arrival (AoA), of the radio wave in the terminal device 100 with respect to the BLE beacon transmitted from the image processing device 200, by an AoA system in the direction detection function. This angle of arrival AoA corresponds to the direction of the image processing device 200 in relation to the terminal device 100. The AoA system may be substantially similar to the foregoing system. That is, the terminal device 100 receives the radio wave, that is, the BLE beacon, via the plurality of antennas. The terminal device 100 calculates the angle of arrival AoA, which is an angle in relation to the direction in which the plurality of antennas are arrayed, based on the distance between the plurality of antennas and the phase difference in the radio wave received by the plurality of antennas. The angle of arrival AoA corresponds to the direction of the image processing device 200 in relation to the terminal device 100.

Alternatively, the terminal device 100 may acquire the direction information representing the direction of the image processing device 200 in relation to the terminal device 100, using a BLE beacon transmitted from the terminal device 100. Specifically, the image processing device 200 detects the angle of transmission, that is, the angle of departure AoD, of the radio wave in the terminal device 100 with respect to the BLE beacon transmitted from the terminal device 100, by an AoD system in the direction detection function. The AoD system may be substantially similar to the foregoing system. That is, the terminal device 100 has a plurality of antennas, as described above. The terminal device 100 emits the radio wave, that is, the BLE beacon, from the plurality of antennas. The image processing device 200 calculates the angle of departure AoD, which is an angle in relation to the direction in which the plurality of antennas are arrayed, based on the distance between the plurality of antennas and the phase difference in the radio wave transmitted from the plurality of antennas. It is assumed that information representing the distance between the plurality of antennas of the terminal device 100 and information representing the timing of transmitting the radio wave from the plurality of antennas are given to the image processing device 200 in advance. These pieces of information may be included in the BLE beacon. The image processing device 200 then transmits a radio wave (BLE beacon or the like) representing the angle of departure AoD to the terminal device 100. The angle of departure AoD corresponds to the direction of the image processing device 200 in relation to the terminal device 100.

Figure 14:
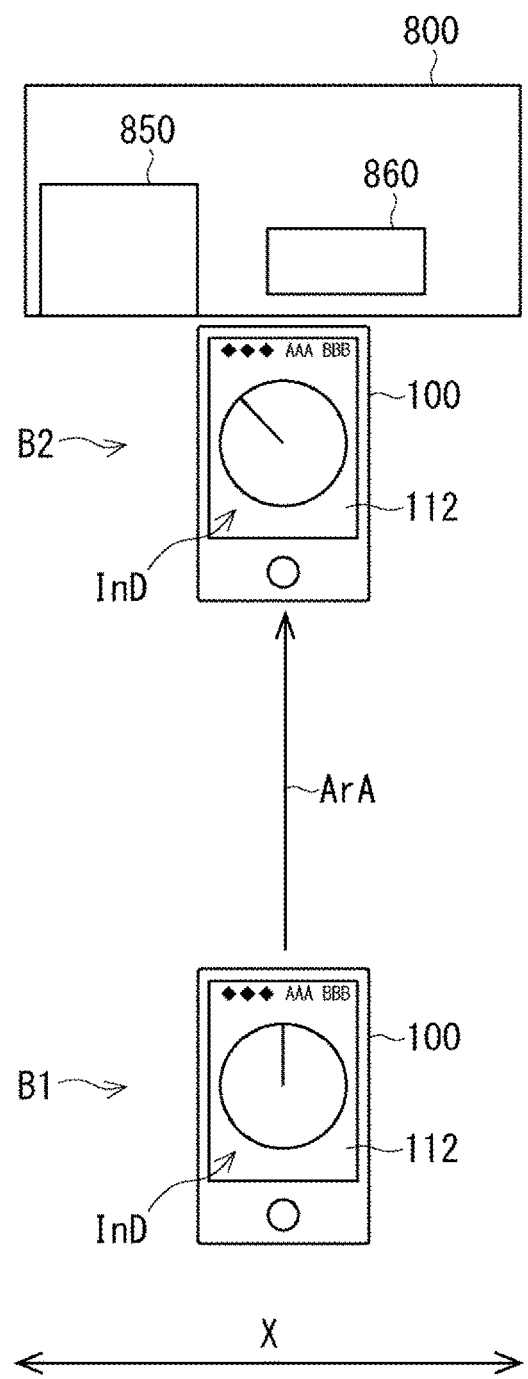
FIG. 14 explains a case where the direction of an image processing device is displayed at a terminal device in a comparative example.

FIG. 14 explains a case where the direction of an image processing device is displayed at a terminal device in a comparative example. In an image processing device 800 according to the comparative example, a communication unit 850 is not provided within a range corresponding to an operation panel 860 in the left-right direction (direction indicated by an arrow X). That is, in the image processing device 800 according to the comparative example, the communication unit 850 is provided at a position away from the operation panel 860 in the left-right direction.

When the terminal device 100 is sufficiently away from the image processing device 800 as indicated by an arrow B1, it can be said that a direction indication InD displayed on the display unit 112 of the terminal device 100 indicates the approximate direction of the image processing device 800. When the terminal device 100 is sufficiently away from the image processing device 800, there is no problem if the direction indication InD indicating the approximate direction of the image processing device 800 is displayed on the display unit 112 of the terminal device 100.

Meanwhile, it is now assumed that the user holding the terminal device 100 moves toward the image processing device 800 as indicated by an arrow ArA and that the terminal device 100 approaches the image processing device 800 to a predetermined distance or closer as indicated by an arrow B2. In this case, the direction indication InD displayed on the display unit 112 indicates the direction of the communication unit 850. It is considered desirable to the user that the direction indication InD indicates the direction of a position which the user pays attention to in the image processing device 800, such as the operation panel 860. However, when the position of the communication unit 850 is away from the operation panel 860 in the image processing device 800, there is a risk that the direction indicated by the direction indication InD may deviate from a desired direction. Therefore, the comparative example has a risk of compromising the convenience for the user.

On the other hand, in the image processing device 200 according to Embodiment 1, the communication unit 250 is provided within a range corresponding to the operation panel 260 in the left-right direction. Thus, the direction indication InD displayed at the terminal device 100 indicates the direction of the operation panel 260. Therefore, the user can properly grasp the direction of the operation panel 260. Thus, the convenience for the user is improved.

Embodiment 2

Embodiment 2 will now be described. Embodiment 2 differs from Embodiment 1 in that the operation panel 260 has a tilt mechanism. The other parts of the configurations of the image processing system 1, the terminal device 100, and the image processing device 200 are substantially similar to those in Embodiment 1 and therefore will not be described further.

Figure 15:
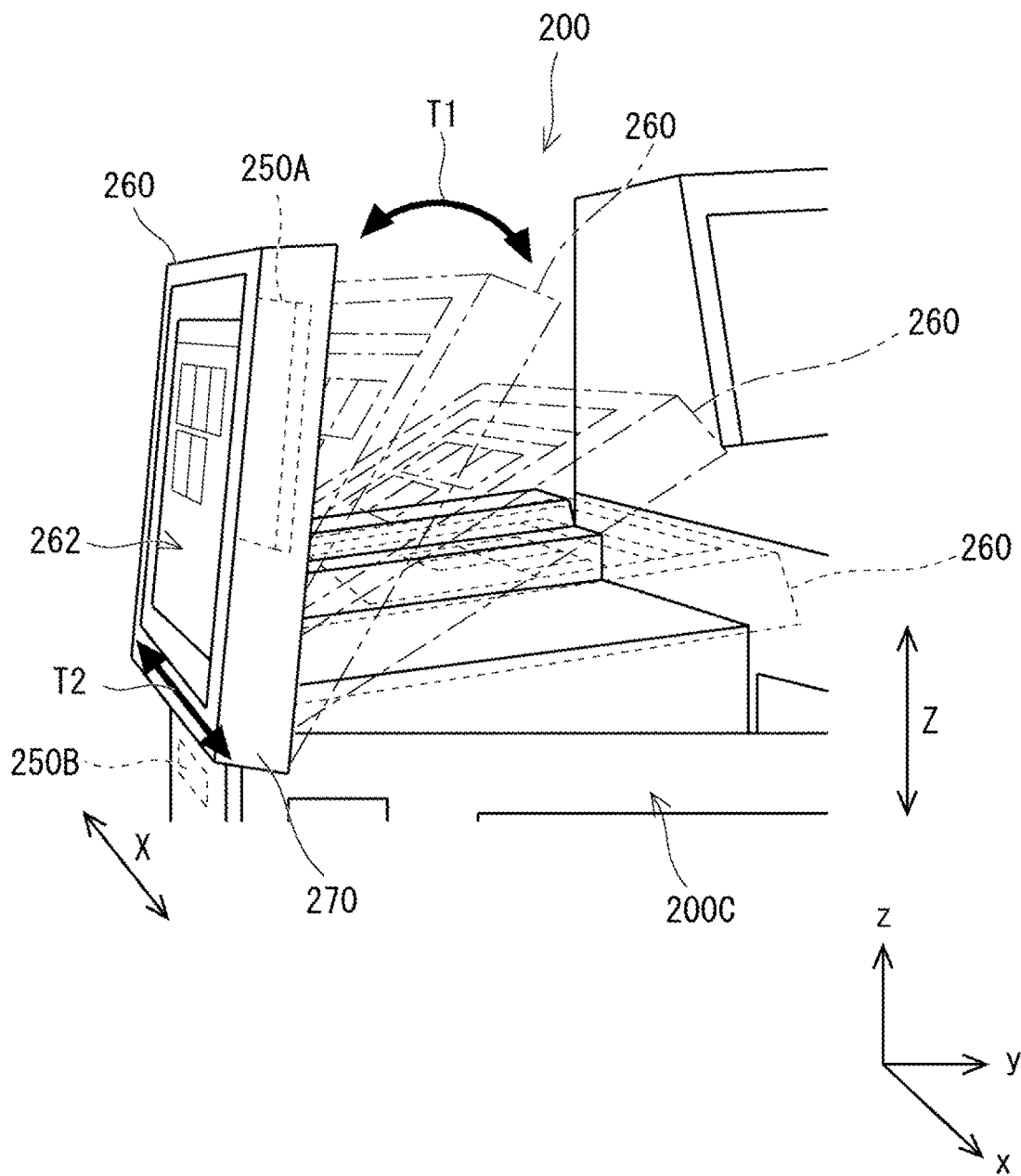
FIG. 15 shows an operation panel according to Embodiment 2.

FIG. 15 shows the operation panel 260 according to Embodiment 2. The operation panel 260 according to Embodiment 2 has a tilt mechanism 270. The tilt mechanism 270 is a mechanism for adjusting the tilt of the operation panel 260. The tilt mechanism 270 enables a tilting movement of the operation panel 260. The tilt mechanism 270 is provided at the lower end of the operation panel 260.

The operation panel 260 is supported to a casing 200c of the image processing device 200 by the tilt mechanism 270. This enables a tilting movement of the operation panel 260. Via the tilt mechanism 270, the operation panel 260 makes a tilting movement as indicated by an arrow T1. The tilt mechanism 270 may be configured, for example, in such a way that the operation panel 260 stops in a tilting state in relation to the casing 200c at a position indicated by a dashed line, a dot-dashed line, or a double-dot-dashed line. The tilt mechanism 270 may also be configured in such a way that the operation panel 260 stops in a tilting state in relation to the casing 200c at any position.

The tilt mechanism 270 has a tilt axis extending in the left-right direction of the image processing device 200 (direction indicated by an arrow X). Therefore, the tilt axis extends along an arrow T2. The tilt axis is the axis of rotation in the tilt mechanism 270. The operation panel 260 makes a tilting movement in such a way as to rotate about the tilt axis.

The communication unit 250 according to Embodiment 2 is provided in such a way that the direction in which the plurality of antennas 252 are arrayed is laid along the direction in which the tilt axis extends as indicated by the arrow T2. In this case, in the first example illustrated in FIG. 7, a communication unit 250A may be provided at the operation panel 260 as indicated by a dashed line in FIG. 15 in such a way that the direction in which the plurality of antennas 252 are arrayed is laid along the direction in which the tilt axis extends as indicated by the arrow T2. In the second example illustrated in FIG. 8, a communication unit 250B may be provided below the operation panel 260 as indicated by a dotted line in FIG. 15 in such a way that the direction in which the plurality of antennas 252 are arrayed is laid along the direction in which the tilt axis extends as indicated by the arrow T2. For the sake of explanation, the communication unit 250A and the communication unit 250B are shown in FIG. 15. However, it should be noted that, in practice, only one of the communication unit 250A and the communication unit 250B may be provided in the image processing device 200.

Modification Examples

The present disclosure is not limited to the above embodiments and can be suitably changed without departing from the spirit and scope of the present disclosure. For example, the orders of the processing steps in the foregoing flowcharts can be suitably changed. Also, one or more of the processing steps in the foregoing flowcharts can be omitted. For example, in the flowchart of FIG. 10, the order of the processing of S104 and the processing of S106 may be reversed or the processing of S104 and the processing of S106 may be executed in parallel. Also, the processing of S112 may be omitted. That is, if the direction of the terminal device 100 in relation to the operation panel 260 is within a predetermined range, the processing of S120 may be executed regardless of the distance to the terminal device 100.

The image processing device 200 according to the foregoing embodiments may cause the operation panel 260 to display whose job is currently being executed, during the execution of a job. The processing by the image processing device 200 according to the foregoing embodiments is also applicable when a plurality of terminal devices 100 exist within a predetermined range. When a plurality of terminal devices 100 exist within a predetermined range, the image processing device 200 may similarly cause the operation panel 260 to display whose job is currently being executed. The message displayed on the operation panel 260 may vary according to whether a job relating to the terminal device 100 nearest to the operation panel 260 is being executed or not.

Figure 16:
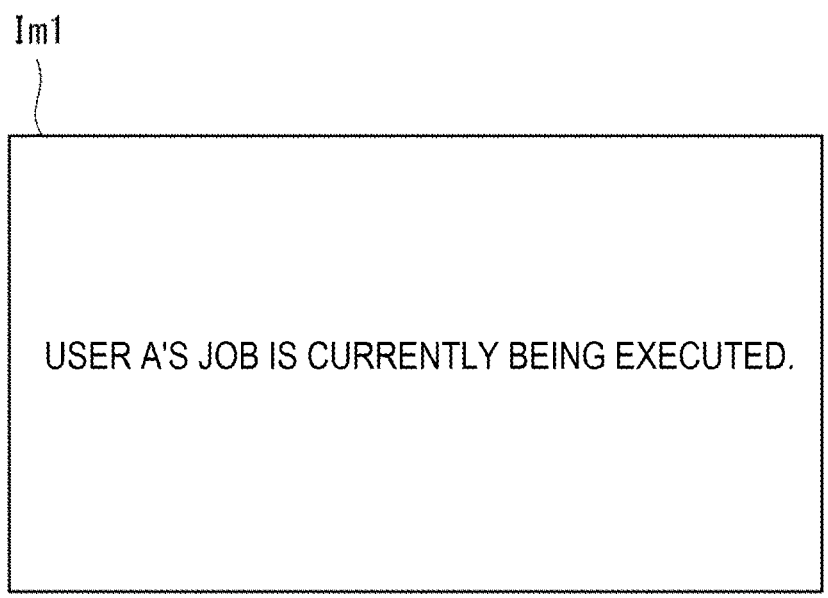
FIG. 16 shows an example of a screen displayed on an operation panel when a plurality of terminal devices exist in the vicinity of the operation panel in a modification example.
Figure 17:
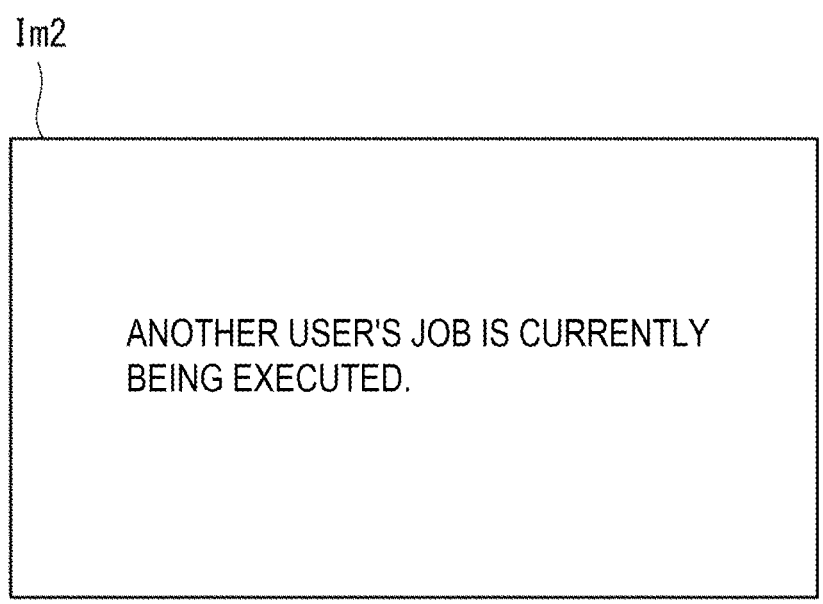
FIG. 17 shows an example of a screen displayed on an operation panel when a plurality of terminal devices exist in the vicinity of the operation panel in a modification example.

FIGS. 16 and 17 show an example of a screen displayed on the operation panel 260 when a plurality of terminal devices 100 exist in the vicinity of the operation panel 260 in a modification example. FIG. 16 shows an example of a screen Im1 displayed on the operation panel 260 when a user A is in front of the operation panel 260 during the execution of the user A's job. In the example shown in FIG. 16, "User A's job is currently being executed" is displayed on the operation panel 260. In this case, the user A viewing the operation panel 260 can grasp that the user A's own job is currently being executed.

FIG. 17 shows an example of a screen Im2 displayed on the operation panel 260 when a user B is in front of the operation panel 260 during the execution of the user A's job. In the example shown in FIG. 17, "Another user's job is currently being executed" is displayed on the operation panel 260. In this case, the user B viewing the operation panel 260 can grasp that a job that is not the user B's own job is currently being executed.

In the above examples, the program includes a command set (or software code) for causing a computer to execute one or more of the functions described in the embodiments, when read by the computer. The program may be stored in a non-transitory computer-readable medium or a substantive storage medium. The computer-readable medium or the substantive storage medium includes, for example but not limited to, a random-access memory (RAM), a read-only memory (ROM), a flash memory, a solid-state drive (SSD) or other memory measures, a CD-ROM, a digital versatile disk (DVD), a Blu-ray (trademark registered) disk or other optical disk storages, a magnetic cassette, a magnetic tape, a magnetic disk storage or other magnetic storage devices. The program may be transmitted via a transitory computer-readable medium or a communication medium. The transitory computer-readable medium or the communication medium includes, for example but not limited to, a propagation signal in an electrical, optical, acoustic or other formats.

What is claimed is:

1. An image processing device communicatively connected to a terminal device, the image processing device comprising:
    an operation panel that accepts an operation from a user;
    a communication unit that has a plurality of antennas and is used to communicate with the terminal device; and
    a controller that performs control according to direction information representing a direction of the terminal device in relation to the image processing device, acquired based on a radio wave transmitted between the terminal device and the communication unit,
    the communication unit being provided within a range corresponding to the operation panel, in a direction of width of the operation panel as viewed from a front face side where the operation panel can be operated, of side faces of the image processing device.

2. The image processing device according to claim 1, wherein
    the communication unit is provided at the operation panel.

3. The image processing device according to claim 1, wherein
    the operation panel has a tilt mechanism that enables a tilting movement of the operation panel, and
    the communication unit is provided in such a way that a direction in which the plurality of antennas are arrayed is laid along a direction in which a tilt axis of the tilt mechanism extends.

4. The image processing device according to claim 1, wherein the communication unit is provided below the operation panel in an up-down direction of the image processing device.

5. The image processing device according to claim 1, wherein
the controller performs processing to cancel a power saving mode of the image processing device when a direction of the terminal device in relation to the operation panel is within a predetermined range that is determined in advance.

* * * * *